United States Patent
Kimmich et al.

(10) Patent No.: US 9,872,329 B2
(45) Date of Patent: Jan. 16, 2018

(54) OPPORTUNISTIC PROGRESSIVE ENCODING

(71) Applicant: ViaSat, Inc., Carlsbad, CA (US)

(72) Inventors: Kevin Kimmich, Chardon, OH (US); Fan Mo, Stow, OH (US); Mark Vanderaar, Medina, OH (US)

(73) Assignee: ViaSat, Inc., Carlsbad, CA (US)

(*) Notice: Subject to any disclaimer, the term of this patent is extended or adjusted under 35 U.S.C. 154(b) by 301 days.

(21) Appl. No.: 14/688,767

(22) Filed: Apr. 16, 2015

(65) Prior Publication Data
US 2016/0014840 A1    Jan. 14, 2016

Related U.S. Application Data

(60) Continuation of application No. 13/310,575, filed on Dec. 2, 2011, now Pat. No. 9,036,716, which is a
(Continued)

(51) Int. Cl.
H04N 7/12    (2006.01)
H04W 76/04    (2009.01)
(Continued)

(52) U.S. Cl.
CPC ......... H04W 76/045 (2013.01); H04L 1/0003 (2013.01); H04L 1/0009 (2013.01);
(Continued)

(58) Field of Classification Search
CPC . H04W 76/045; H04N 19/115; H04N 19/162; H04N 19/164; H04N 19/30;
(Continued)

(56) References Cited

U.S. PATENT DOCUMENTS 6,038,256 A    3/2000 Linzer et al.
6,167,084 A    12/2000 Wang et al.
(Continued)

OTHER PUBLICATIONS

Non-Final Office Action mailed in U.S. Appl. No. 11/956,200 dated Aug. 3, 2011, 23 pgs.
(Continued)

Primary Examiner — Nhon Diep
(74) Attorney, Agent, or Firm — Marsh Fischmann & Breyfogle LLP; Daniel J. Sherwinter

(57) ABSTRACT

Methods, systems, and devices are described for communicating data from multiple data terminals to an aggregator terminal over a communication link having changing link conditions. In some embodiments, source data is received at multiple data terminals, each in communication with an aggregator terminal over a communication link. For example, during a live newscast, one mobile camera may receive live video of an event from a first position while another mobile camera receives live video of the event from a second position. For various reasons (e.g., as the cameras move) each communication link may experience independently changing link conditions. Each data terminal encodes the source data (or store source data for later encoding) as a function of its respective link conditions, and transmits encoded source data over its respective communication link to the aggregator terminal.

20 Claims, 16 Drawing Sheets

Related U.S. Application Data division of application No. 12/192,544, filed on Aug. 15, 2008, now abandoned, which is a continuation-in-part of application No. 11/956,200, filed on Dec. 13, 2007, now abandoned.

(60) Provisional application No. 60/869,809, filed on Dec. 13, 2006.

(51) Int. Cl.

| | | |
|---|---|---|
| *H04L 1/00* | (2006.01) | |
| *H04N 7/18* | (2006.01) | |
| *H04N 21/2383* | (2011.01) | |
| *H04N 21/438* | (2011.01) | |
| *H04N 21/61* | (2011.01) | |
| *H04N 19/46* | (2014.01) | |
| *H04N 19/30* | (2014.01) | |
| *H04N 19/115* | (2014.01) | |
| *H04N 19/61* | (2014.01) | |
| *H04N 19/162* | (2014.01) | |
| *H04N 19/164* | (2014.01) | |
| *H04N 19/89* | (2014.01) | |
| *H04N 19/85* | (2014.01) | |
| *H04N 19/66* | (2014.01) | |

(52) U.S. Cl.
CPC ........... *H04L 1/0014* (2013.01); *H04N 7/185* (2013.01); *H04N 19/115* (2014.11); *H04N 19/162* (2014.11); *H04N 19/164* (2014.11); *H04N 19/30* (2014.11); *H04N 19/46* (2014.11); *H04N 19/61* (2014.11); *H04N 19/66* (2014.11); *H04N 19/85* (2014.11); *H04N 19/89* (2014.11); *H04N 21/2383* (2013.01); *H04N 21/4382* (2013.01); *H04N 21/6143* (2013.01); *H04N 21/6193* (2013.01); *H04L 1/0026* (2013.01); *H04L 2001/0093* (2013.01)

(58) Field of Classification Search
CPC ........ H04N 19/46; H04N 19/61; H04N 19/66; H04N 19/85; H04N 19/89; H04N 7/185; H04N 21/2383; H04N 21/4382; H04N 21/6143; H04N 21/6193; H04L 1/0003; H04L 1/0009; H04L 1/0014; H04L 1/0026; H04L 2001/0093

See application file for complete search history.

(56) References Cited

U.S. PATENT DOCUMENTS

| | | |
|---|---|---|
| 6,339,450 B1 | 1/2002 | Chang et al. |
| 6,374,112 B1 | 4/2002 | Widegren et al. |
| 6,798,838 B1 | 9/2004 | Ngo |
| 6,925,120 B2 | 8/2005 | Zhang et al. |
| 7,333,439 B2 * | 2/2008 | Itoh ...................... H04L 1/0002 370/252 |
| 7,382,729 B2 | 6/2008 | Honda et al. |
| 7,406,176 B2 | 7/2008 | Zhu et al. |
| 7,483,487 B2 | 1/2009 | Liu et al. |
| 7,667,707 B1 | 2/2010 | Margulis |
| 7,860,161 B2 | 12/2010 | Xu et al. |
| 9,036,716 B2 | 5/2015 | Kimmich et al. |
| 2007/0087756 A1 * | 4/2007 | Hoffberg ............ G06Q 10/0631 455/450 |
| 2008/0130563 A1 * | 6/2008 | Xu ......................... H04W 4/02 370/329 |
| 2008/0144713 A1 | 6/2008 | Kimmich et al. |
| 2008/0159180 A1 * | 7/2008 | Civanlar ............. H04L 12/1836 370/261 |
| 2009/0034609 A1 | 2/2009 | Peng et al. |
| 2009/0041100 A1 | 2/2009 | Kimmich et al. |

OTHER PUBLICATIONS

Final Office Action mailed in U.S. Appl. No. 11/956,200 dated Jan. 25, 2012, 29 pgs.

Non-Final Office Action mailed in U.S. Appl. No. 12/192,544 dated May 25, 2011, 12 pgs.

Final Office Action mailed in U.S. Appl. No. 12/192,544 dated Sep. 13, 2011, 11 pgs.

\* cited by examiner

| Modulation and Coding Scheme | Identifier |
|---|---|
| QPSK 1/4 | 1 |
| QPSK 1/3 | 2 |
| QPSK 2/5 | 3 |
| QPSK 1/2 | 4 |
| QPSK 3/5 | 5 |
| QPSK 2/3 | 6 |
| QPSK 3/4 | 7 |
| QPSK 4/5 | 8 |
| QPSK 5/6 | 9 |
| QPSK 8/9 | 10 |
| QPSK 9/10 | 11 |
| 8PSK 3/5 | 12 |
| 8PSK 2/3 | 13 |
| 8PSK 3/4 | 14 |
| 8PSK 5/6 | 15 |
| 8PSK 8/9 | 16 |
| 8PSK 9/10 | 17 |
| 16APSK 2/3 | 18 |
| 16APSK 3/4 | 19 |
| 16APSK 4/5 | 20 |
| 16APSK 5/6 | 21 |
| 16APSK 8/9 | 22 |
| 16APSK 9/10 | 23 |
| 32APSK 3/4 | 24 |
| 32APSK 4/5 | 25 |
| 32APSK 5/6 | 26 |
| 32APSK 8/9 | 27 |
| 32APSK 9/10 | 28 |

FIG. 6

OPPORTUNISTIC PROGRESSIVE ENCODING

CROSS REFERENCE

The present application is a continuation of U.S. patent application Ser. No. 13/310,575, filed on Dec. 2, 2011, and entitled LINK AWARE MOBILE DATA NETWORK," which is a divisional of U.S. patent application Ser. No. 12/192,544, filed on Aug. 15, 2008, and entitled "LINK AWARE MOBILE DATA NETWORK," which is continuation-in-part of U.S. patent application Ser. No. 11/956,200, filed on Dec. 13, 2007, and entitled "ACM AWARE ENCODING SYSTEMS AND METHODS," which claims priority to Provisional Application No. 60/869,809, filed on Dec. 13, 2006, and entitled "ADAPTIVE CODING & MODULATION (ACM) AWARE ENCODER SYSTEM." which are hereby incorporated by reference, as if set forth in full in this document, for all purposes.

BACKGROUND

The present invention relates to data communications in general and, in particular, to link-aware adaptive communications networks.

Data networks may use multiple data terminals to simultaneously collect data from multiple sources in multiple locations and aggregate the data at a base location. For example, during a newscast, a mobile production station (e.g., a specially outfitted truck) may aggregate video, audio, text, and other data from geographically distributed cameras, microphones, newswires, databases, etc. When some or all of these data terminals communicate with the base location wirelessly, changing link conditions (e.g., changes in weather) may result in changing data conditions (e.g., changes in data quality, latency, etc.).

Various techniques may dynamically adjust pre-coding, coding, and/or modulation schemes to adapt to these changing link conditions. For example, as link conditions worsen, the integrity of data being communicated over those links may be increased or maintained by using more reliable (lower order) coding and modulation schemes. Without an awareness of the link conditions, however, it may not be possible to fully exploit these and other adaptive techniques.

Thus, there may be a general need in the art for providing data terminals and aggregator terminals having link awareness and adaptation capabilities.

SUMMARY

Among other things, methods, systems, and devices are described for providing data terminals and aggregator terminals having link awareness and adaptation capabilities.

In some embodiments, source data (e.g., a video stream) is received at multiple data terminals, each in communication with an aggregator terminal over a communication link. Each communication link may experience changing link conditions and likely has different link conditions from other communication links. Each of the data terminals encodes the source data as a function of the link conditions associated with its respective communication link (e.g., current link conditions, predicted link conditions, past link conditions, etc.). At least a portion of the encoded source data is communicated over its respective communication link to an aggregator terminal. In certain embodiments, the aggregator terminal is adapted to receive and aggregate multiple encoded data streams from the multiple data terminals. The aggregator terminal may have additional functionality, like dynamic buffering. In certain embodiments, the aggregator terminal is further adapted to monitor and/or control operation of some or all of the data terminals, for example as a function of changing link conditions.

In one set of embodiments, a link-aware data system is provided for communicating data between multiple data terminals and an aggregator terminal over communication links with changing link conditions. The system includes an aggregator unit, adapted to receive data over a plurality of communication links and aggregate the data into an aggregate dataset; and a plurality of data terminals, each communicatively coupled with the aggregator unit via at least one of the plurality of communication links. Each data terminal includes a receiver unit adapted to receive source data from a data source; a link awareness unit adapted to generate a link condition defining a condition of the at least one of the plurality of communication links; an adaptive coder unit, communicatively coupled with the receiver unit and the link awareness unit, and adapted to encode the source data into an encoded data signal as a function of the link condition; and a transceiver unit, communicatively coupled with the adaptive coder unit, and adapted to transmit the encoded data signal over the at least one of the plurality of communication links, wherein the aggregator unit is adapted to receive data by receiving the encoded data signal over the at least one of the plurality of communication links.

In another set of embodiments, a method is provided for receiving source data and transmitting the source data over a communication link having changing link conditions. The method includes storing at least a portion of the source data as a first representation dataset representing the source data; pre-coding at least a portion of the source data using a first pre-coding scheme to generate a second representation dataset, decodable to provide a set of first-level playback data representing the source data, the second representation dataset being different from the first representation dataset; generating a link condition defining a condition of the communication link; encoding the second representation dataset into an encoded data signal as a function of the link condition; and transmitting the encoded data signal over the communication link.

In yet another set of embodiments, a link-aware data system is provided for receiving source data and transmitting the source data over a communication link having changing link conditions. The system includes a receiver unit adapted to receive the source data from a data source; a link awareness unit adapted to generate a link condition defining a condition of the communication link; an adaptive coder unit, communicatively coupled with the receiver unit and the link awareness unit, and adapted to encode the source data into an encoded data signal as a function of the link condition; and a transceiver unit, communicatively coupled with the adaptive coder unit, and adapted to transmit the encoded data signal over the communication link.

In still another set of embodiments, a method is provided for adaptively aggregating data received over communication links having changing link conditions. The method includes receiving a first encoded data signal from a first data system over a first communication link, the first encoded data signal being encoded by the first data system using a first encoding scheme as a function of a first link condition defining a condition of the first communication link; receiving a second encoded data signal; aggregating at least a portion of the first encoded data signal and at least a portion of the second encoded data signal to generate an aggregate dataset; analyzing the aggregate dataset to make a data deficiency determination; generating a control signal as a function of the data deficiency determination; and transmitting the control signal to the first data system, the control signal being adapted to affect operation of the first data system.

In even another set of embodiments, a system is provided for adaptively aggregating data from a plurality of remote data terminals over communication links having changing link conditions. The system includes a first receiver unit, adapted to receive a first encoded data signal from a first data system over a first communication link, the first encoded data signal being encoded by the first data system using a first encoding scheme as a function of a first link condition defining a condition of the first communication link; a second receiver unit, adapted to receive a second encoded data signal from a second data system over a second communication link, the second encoded data signal being encoded by the second data system using a second encoding scheme as a function of a second link condition defining a condition of the second communication link; and an analyzer unit, communicatively coupled with the first receiver unit and the second receiver unit, and adapted to generate an aggregate dataset as a function of data from the first encoded data signal and data from the second encoded data signal.

And in another set of embodiments, a computer-readable storage medium is provided having a computer-readable program embodied therein for directing operation of a link-aware data terminal, the computer-readable program including instructions for receiving source data and transmitting the source data over a communication link having changing link conditions. The computer-readable program instructions are in accordance with the following: storing at least a portion of the source data as a first representation dataset representing the source data; pre-coding at least a portion of the source data using a first pre-coding scheme to generate a second representation dataset, decodable to provide a set of first-level playback data representing the source data, the second representation dataset being different from the first representation dataset; generating a link condition defining a condition of the communication link; encoding the second representation dataset into an encoded data signal as a function of the link condition; and transmitting the encoded data signal over the communication link.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label, or a lower-case character, that distinguishes among the similar components. If only the first reference label is used in the specification, the description is applicable to any one of the similar components having the same first reference label irrespective of the second reference label.

FIG. 6 provides an illustration of an exemplary table of identifier data for use with various embodiments of the invention.

DETAILED DESCRIPTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Figure 1:
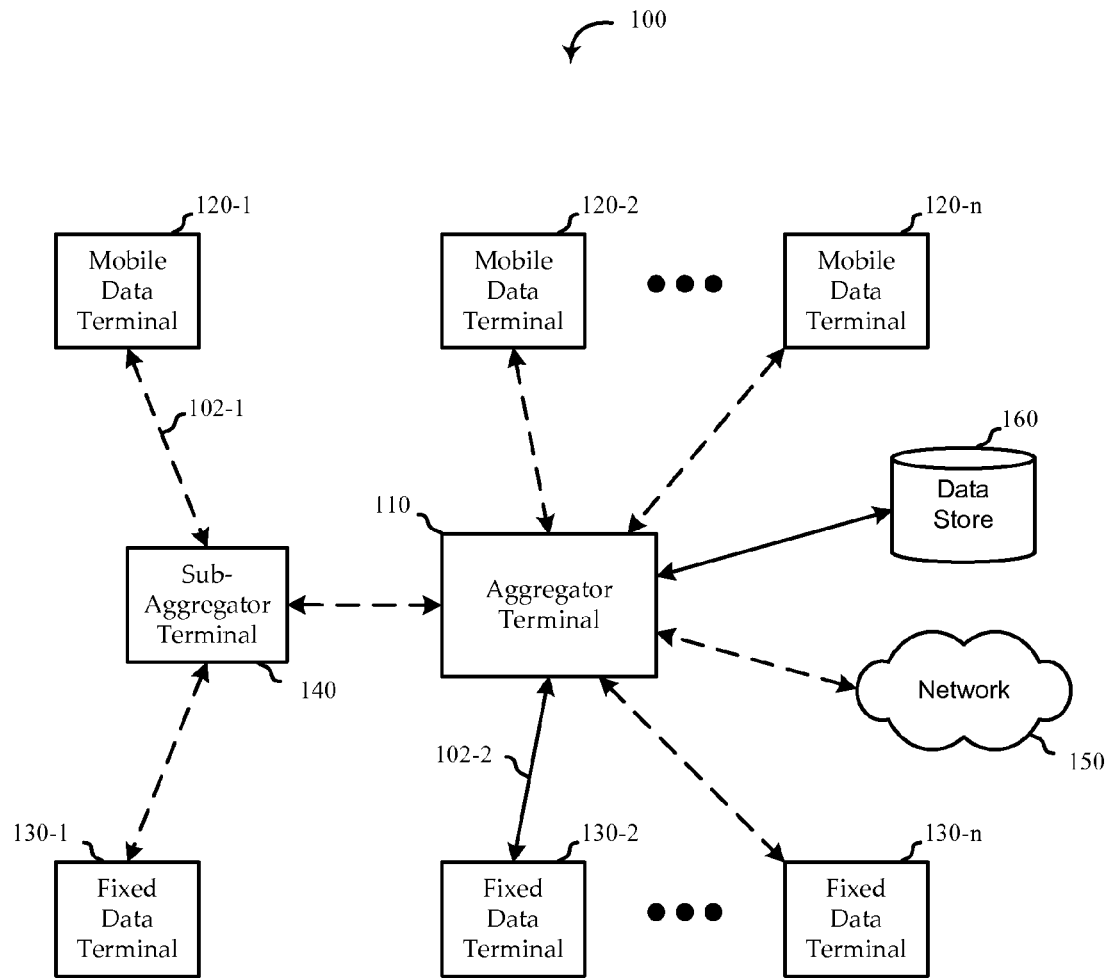
FIG. 1 shows a simplified block diagram of a link-aware data communication and aggregation system, according to various embodiments of the invention.

Among other things, the description provides methods, systems, software, and devices for transmitting source data from multiple data terminals to an aggregator terminal over communication links having changing link conditions. Turning first to FIG. 1, a simplified block diagram of a link-aware data communication and aggregation system is provided, according to various embodiments of the invention. The system 100 includes a number of mobile data terminals 120 and a number of fixed data terminals 130, all communicatively coupled with an aggregator terminal 110.

In some embodiments, source data is received at each of the multiple data terminals, including the mobile data terminals 120 and the fixed data terminals 130. Embodiments of source data may include audio, video, and/or any other type of media or non-media data. Further, source data may be received live, streaming, stored, raw, encoded, or in any other useful form. For example, video source data may include a scene from which live video may be received, a live video stream being streamed from another device or network, a stored video stream being received from a data store (e.g., a tape, drive, server, etc.), etc.

It will be appreciated that the mobile data terminals 120 and fixed data terminals 130 may include any devices, systems, components, and/or software capable of receiving source data and communicating the source data to the aggregator terminal 110. In one illustrative embodiment, a number of mobile data terminals 120 and fixed data terminals 130 are used to generate and receive data relating to an automobile racing event. Multiple mobile cameras (e.g., in various cars, on remote dollies, etc.) may be used as mobile data terminals 120 for receiving live video feeds of the event from various locations and angles, a stationary newscaster (e.g., in an announcer's booth) and a sideline cameraman may have fixed cameras for use as fixed data terminals 130, a remote server may be used as a fixed data terminal 130 from which to receive archive footage, and a geosynchronous satellite may be used as a fixed data terminal 130 for receiving weather information. The source data from each of these mobile data terminals 120 and fixed data terminals 130 may be sent to an aggregator terminal 110 for aggregation and/or production.

Certain of the mobile data terminals 120 and/or fixed data terminals 130 may communicate with the aggregator terminal 110 over communication links 102 having changing link conditions (e.g., communication link 102-1), while others may communicate with the aggregator terminal 110 over communication links 102 having stable or fixed link conditions (e.g., communication link 102-2). Link conditions may include any type of parameter associated with a communication link that may affect the communication of data over the link. For example, a communication link may be characterized by its bandwidth, signal-to-noise ratio, bit error rate, power level, data traffic priority, data traffic protocol, latency, cost-per-bit, etc. Notably, some or all of these link conditions may change over time. For example, a changing geographic location of a mobile data terminal 120 relative to the aggregator terminal 110 may affect the signal-to-noise ratio and latency of a communication link between them.

Embodiments of the mobile data terminals 120 and/or fixed data terminals 130 may be adapted to encode the source data as a function of the link conditions (e.g., current link conditions, predicted link conditions, past link conditions, etc.). For example, as a mobile data terminal 120 moves, its link condition may change so as to adversely affect data integrity over a communication link between the mobile data terminal 120 and the aggregator terminal 110. The mobile data terminal 120 may be adapted to at least partially counteract this effect by using a different encoding scheme (e.g., a higher order encoding scheme, as described below).

In some embodiments, the mobile data terminals 120 and/or fixed data terminals 130 are further adapted to store some or all of the source data (e.g., in a drive, server, buffer, etc.). The stored source data may be encoded for transmission at a different time or under different link conditions. In certain embodiments, certain, more critical elements of the received source data are encoded using a first encoding scheme and transmitted to the aggregator terminal 110 using a high-reliability transmission scheme. Other, less critical elements of the received source data may be stored, encoded, and or transmitted differently. For example, less critical source data elements may be transmitted only under certain link conditions, transmitted using lower-reliability transmission schemes, encoded using different encoding schemes, etc.

For example, say a mobile data terminal 120 transmits a down-converted portion of its received source data to compensate for undesirable link conditions substantially at the time the source data is received. In one embodiment, the down-converted data is insufficient to generate production-quality video data, but is sufficient to provide certain other information (e.g., blocking of the scene, audio from the scene, positions of certain objects or people in the scene, general color balance information, timing information, etc.). For example, it may be possible to begin blocking out video footage, storyboards, and other production-related tasks using the down-converted data. In another embodiment, the down-converted data is sufficient for generating a low-resolution video feed (e.g., for use on cellular telephone screens, standard-definition televisions, etc.), but is insufficient for providing a high-resolution video feed (e.g., for use on high-definition televisions, very large displays, etc.).

In these and other embodiments, at certain times or over a period of time, additional data may be transmitted to the aggregator terminal 110 from some or all of the mobile data terminals 120 or fixed data terminals 130. In one embodiment supplemental elements from the source data may be transmitted over time to the aggregator terminal 110 to be aggregated with previously transmitted elements from the source data. For example, high-definition elements may be transmitted to the aggregator terminal 110 to fill in previously transmitted low-definition elements from a particular set of source data. Where the high-definition elements are less critical, they may be transmitted accordingly (e.g., by using lower-reliability transmission schemes).

In some embodiments, the aggregator terminal 110 is adapted to monitor and/or control operation of some or all of the mobile data terminals 120 and/or fixed data terminals 130. In certain embodiments, the aggregator terminal monitors deficiencies in the incoming data and transmits control signals to the mobile data terminals in an attempt to resolve those data deficiencies. It will be appreciated that data deficiencies may include any type of information gained from analyzing the aggregate dataset to determine what other data may be necessary or desirable. For example, data deficiencies may include unusable data (e.g., data that is missing, incorrect, corrupt, incompatible, etc.), missing or deficient source data content (e.g., missing viewpoints or angles, bad lighting, missing source data elements that may or may not be stored at a data terminal), etc.

In one embodiment, the aggregator terminal 110 determines that data originating from a particular mobile data terminal 120-2 is not being received at the aggregator terminal 110 with desirable integrity. The aggregator terminal 110 may generate a control signal and transmit the control signal to the particular mobile data terminal 120-2, causing the particular mobile data terminal 120-2 to adjust its encoding scheme to achieve better data integrity over the communication link. In another embodiment, the aggregator terminal 110 determines that data originating from the particular mobile data terminal 120-2 is using too wide of a field of view setting (e.g., according to some automatic algorithmic determination or according to some manual human determination). The aggregator terminal 110 may generate a control signal and transmit the control signal to the particular mobile data terminal 120-2, causing the particular mobile data terminal 120-2 to adjust its field-of-view setting (e.g., either automatically in response to the control signal or by informing the operator of the particular mobile data terminal 120-2 to make the change).

It will be appreciated that embodiments of the aggregator terminal 110 may be adapted to monitor and/or control operation of the mobile data terminals 120 and/or fixed data terminals 130 in any useful way. It will be further appreciated that the aggregator terminal 110 may be adapted to provide additional functionality. For example, embodiments of the aggregator terminal 110 may include functionality for data processing, data production, data storage, data transmission, interfacing with operators and other systems, etc.

In certain embodiments, one or more mobile data terminals 120 and/or fixed data terminals 130 may communicate with the aggregator terminal 110 through one or more intermediaries. For example, a localized sub-aggregator terminal 140 may receive data and retransmit the data to the aggregator terminal 110. It will be appreciated that the sub-aggregator terminal 140 may include some or all of the functionality of the mobile data terminals 120, fixed data terminals 130, and/or aggregator terminal 110.

It will be appreciated that many types of networks may provide communication links with changing link conditions, according to various embodiments of the invention. Further, it will be appreciated that a link-aware system may be able to adjust (e.g., compensate) as a function of changes in link conditions in a number of ways, according to various embodiments of the invention. By way of illustration, FIGS. 2-11 describe some of the various systems and methods according to embodiments of the invention for link-aware encoding in a communication system.

Figure 2:
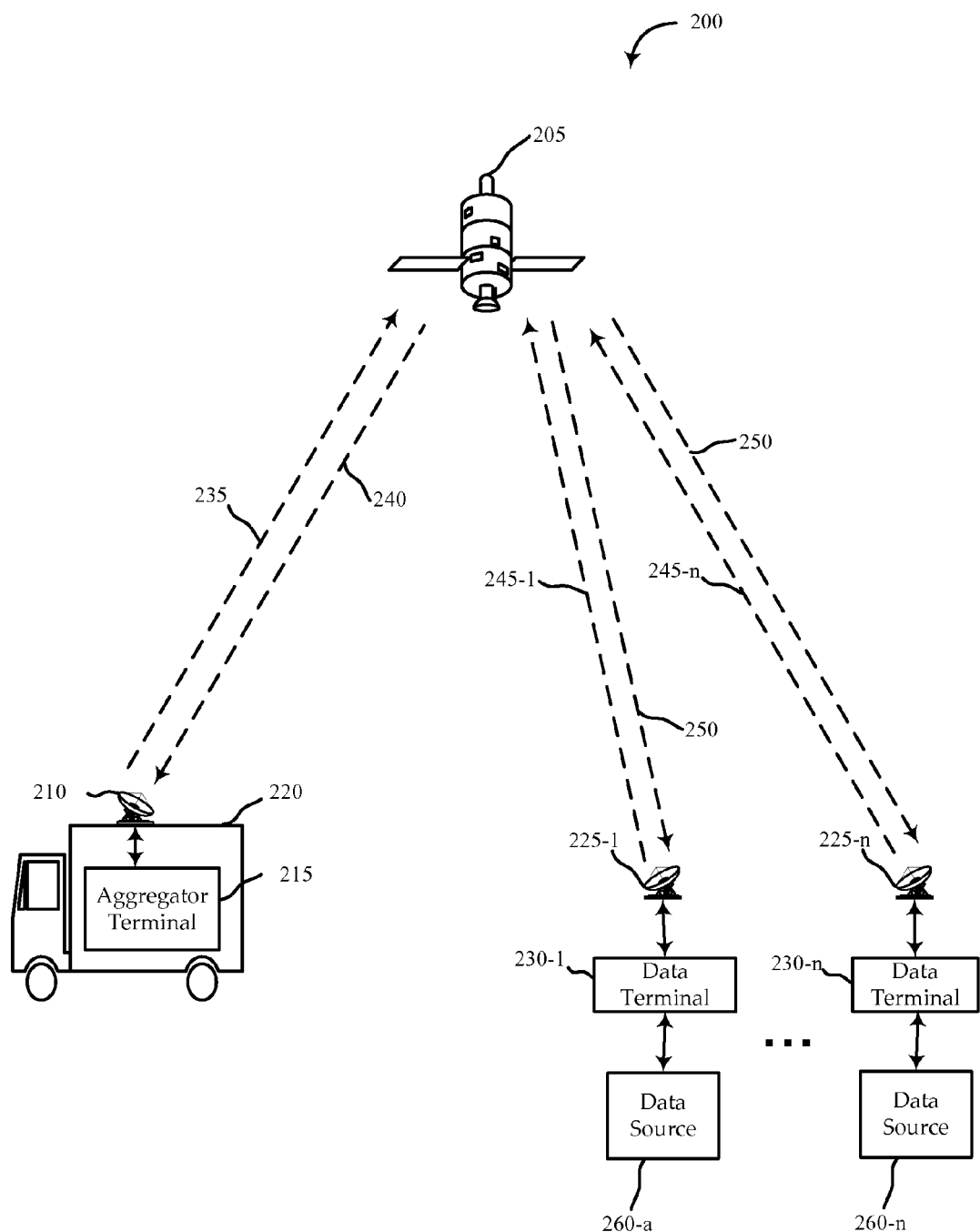
FIG. 2 shows a simplified block diagram of a satellite communication system for use with various embodiments of the invention.

FIG. 2 shows a simplified block diagram of a satellite communication system for use with various embodiments of the invention. While a satellite communication system is used to illustrate various aspects of the invention, it is worth noting that certain principles set forth herein are applicable to a variety of other wireless systems, as well. The satellite communications system 200 includes an aggregator station 215 (e.g., the aggregator terminal 110 of FIG. 1) that is configured to communicate with one or more data terminals 230 (e.g., the mobile data terminals 120 and/or the fixed data terminals 130 of FIG. 1) via a satellite 205.

In some embodiments, the aggregator station 215 is included in a mobile base station 220 (e.g., a truck) that maintains a connection with the satellite network 200. Embodiments of the aggregator station 215 may be configured to receive data and information directed to one or more data terminals 230, and can format the data and information for delivery to the respective data terminal 230 via the satellite 205. Similarly, the aggregator station 215 may be configured to receive signals from the satellite 205, including, but not limited to encoded data from one or more data terminals 230.

In some embodiments, the data terminals 230 use adaptive coding and modulation ("ACM") to generate layered transmissions of information to the aggregator station 215. ACM may allow the satellite communication system 200 to dynamically adjust the coding and modulation schemes applied to transmissions to adapt to changing link conditions. Lower order coding and modulation schemes may use lower order modulation and lower information densities to provide more reliable transmission of information over the communication link. Thus, while lower order coding and modulation schemes may be more reliable, they may also be less bandwidth efficient (e.g., less information may be transmitted per unit bandwidth per unit time). This may mean that, in order to maintain the availability or integrity of communications over the satellite communication network 200 in changing link conditions, the amount of information transmitted over a communication link per unit time may be dynamic.

Table 1 (below) provides a purely exemplary set of data to further clarify the trade-off between availability and bandwidth efficiency. As such, the data in Table 1 should not be construed as limiting the scope of the invention. Referring to Table 1, the leftmost column shows the availability of an exemplary communication system ranging from 99% to 99.99%. The remaining columns, from left to right, show metrics relating to the link margin, signal-to-noise ratio, coding and modulation scheme, and bandwidth efficiency of the exemplary communication system, respectively. As illustrated by Table 1, lower order coding and modulation schemes are used to increase availability of the network (i.e., the coding and modulation scheme is changed from 16APSK 3/4 to QPSK 3/4 to increase availability from 99% to 99.99%). The illustrative result shows a decrease in bandwidth efficiency from 2.97 to 1.32, almost a 60% decrease in bandwidth efficiency.

TABLE 1

Availability vs. Bandwidth Efficiency

| Availability | Link Margin (dB) | Operating Es/No (dB) | Selected Coding and Modulation Scheme | Bandwidth Efficiency |
|---|---|---|---|---|
| 99% | 0.53 | 10.67 | 16APSK ¾ | 2.97 |
| 99.9% | 2.33 | 8.87 | 8PSK ¾ | 2.23 |
| 99.99% | 7.19 | 4.01 | QPSK ¾ | 1.32 |

In some embodiments, the aggregator station 215 may further use hierarchical pre-coding schemes at least in part to mitigate the trade-off between availability and bandwidth efficiency. In certain embodiments, hierarchical pre-coding schemes may include simulcasting (simultaneously broadcasting) multiple versions of a set of source data (e.g., standard- and high-definition versions of a video stream). In other embodiments, hierarchical pre-coding schemes may include scalable pre-coding schemes, data partitioning schemes, and other pre-coding schemes, as described below. In certain embodiments, the hierarchically pre-coded data may be adaptively coded and/or modulated for transmission over the communication link in a layered fashion. In this way, it may be possible to affect either or both of availability and bandwidth efficiency per each hierarchical data layer, adding flexibility to the satellite communication system 200.

In certain embodiments, the aggregator station 215 and/or data terminals 230 may use either or both of ACM and hierarchical pre-coding schemes. In one example, multiple hierarchical layers are created, but a single coding and modulation scheme is used for all the layers. In another example, a single layer may be sent using multiple coding and modulation schemes. In other embodiments, the aggregator station 215 and/or data terminals 230 may pre-code, code, and/or modulate only a portion of the data. For example, a data terminal 230-1 may detect that only enough bandwidth is available to transmit a single layer over the communication link. In this case, it may be efficient for the data terminal 230-1 to generate only a single layer for some or all of the incoming source data.

Source data (e.g., IP datagrams, video feeds, etc.) may be communicates from one or more data terminals 230 to the aggregator station 215. A variety of physical layer transmission modulation and coding techniques may be used with certain embodiments of the invention, including those defined with the DVB-S2 and WiMAX standards. In a number of embodiments, the data terminals 230 utilize ACM in conjunction with one or more hierarchical data pre-coding schemes described herein to direct traffic to the aggregator station 215.

The aggregator station 215 may also use various techniques to communicate with one, a subset, or all of the data terminals 230. In one embodiment, the aggregator station 215 uses a broadcast signal, with a modulation and coding format adapted for each packet to the link conditions of the terminal 230 or set of terminals 230 to which the packet is directed (e.g., to account for the variable downlink 250 conditions from the satellite 205 to each respective terminal 230). In other embodiments, other techniques (e.g., unicast, multicast, etc.) and/or other protocols are used.

The aggregator station 215 may use an antenna 210 to communicate with the satellite 205. In one embodiment, the antenna 210 includes a parabolic reflector with high directivity in the direction of the satellite and low directivity in other directions. The antenna 210 may be implemented in a variety of alternative configurations. Certain signals may include, for example, a number of single carrier signals. Each signal carrier signal may be divided (e.g., using Time Division Multiple Access ("TDMA")) into a number of virtual channels. The virtual channels may be the same size, or different sizes. In other embodiments, other channelization schemes may be used, such as Frequency Division Multiple Access ("FDMA"), Orthogonal Frequency Division Multiple Access ("OFDMA"), Code Division Multiple Access ("CDMA"), or any number of hybrid or other schemes known in the art. Embodiments of the data terminals 230 are also adapted to use antennae 225 to communicate with the satellite 205. The antennae 225 of the data terminals 230 may be the same as or different from each other and/or the antenna 210 of the aggregator station 215.

In one embodiment, a geostationary satellite 205 is configured to receive the signals from the antenna (210 or 225) and within the frequency band and specific polarization transmitted. The satellite 205 may process received signals, forwarding signals received from the aggregator station 215 to one or more data terminals 230, and forwarding signals received from the one or more data terminals 230 to the aggregator station 215. In some embodiments, only a portion of the data terminals 230 may be able to send and/or receive some or all of the signals due to certain link conditions.

In another embodiment, the satellite 205 operates in a multi-beam mode, transmitting a number of narrow beams each directed at a different region of the earth, allowing for frequency re-use. This satellite 205 may be configured as a "bent pipe" satellite, wherein the satellite 205 may frequency convert the received carrier signals before retransmitting these signals to their destination, but otherwise perform little or no other processing on the contents of the signals. A variety of physical layer transmission modulation and coding techniques may be used by the satellite 205 in accordance with certain embodiments of the invention, including those defined with the DVB-S2 and WiMAX standards. For other embodiments, a number of configurations are possible (e.g., using LEO satellites, or using mesh networks instead of star networks), as known in the art.

The service signals 250 transmitted from the satellite 205 may be received by one or more data terminals 230, via the respective subscriber antenna 225. The data terminals 230 may send/receive the signals to/from the satellite 205 under very diverse link conditions. In certain embodiments, the data terminals 230 may encode sent signals and/or decode received signals differently based on different link conditions.

In one embodiment, the antenna 225 and terminal 230 together comprise a very small aperture terminal ("VSAT"). In other embodiments, a variety of other types of antennas 225 may be used at the subscriber terminal 230 to send/receive a signal. Each of the data terminals 230 may comprise a single user terminal or, alternatively, a hub or router (not pictured) that is coupled to multiple user terminals.

In one embodiment, a Multi-Frequency TDMA ("MF-TDMA") scheme is used for some links (e.g., 240 and 245), allowing efficient streaming of traffic while maintaining flexibility in allocating capacity among each of the data terminals 230. In this embodiment, a number of frequency channels are allocated which may be fixed, or which may be allocated in a more dynamic fashion. A TDMA scheme is also employed in each frequency channel. In this scheme, each frequency channel may be divided into several timeslots that can be assigned to a connection (i.e., a subscriber terminal 230). In other embodiments, one or more links may be configured with other schemes, such as FDMA, OFDMA, CDMA, or any number of hybrid or other schemes known in the art.

A subscriber terminal 230 may transmit information related to signal quality to the aggregator station 215 via the satellite 205. The signal quality may be a measured signal to noise ratio, an estimated signal to noise ratio, a bit error rate, a received power level, or any other communication link quality indicator. The subscriber terminal 230 itself may measure or estimate the signal quality, or it may pass information measured or estimated by other devices. This signal quality information may be used by the aggregator station 215 in some embodiments to adapt decoding, aggregation, pre-coding schemes, and/or coding and modulation schemes to match link conditions. Similarly, in some embodiment, the aggregator station 215 may transmit control signals and/or information related to signal quality to one or more data terminals 230 via the satellite 205. It is worth noting that the aggregator station 215 and the data terminals 230 may communicate according to a variety of physical layer transmission modulation and coding techniques, including those defined with the DVB-S2 and WiMAX standards. In various embodiments, the physical layer techniques may be the same for each of the links 235, 240, 245, 250, or may be different.

The functions of the components of the satellite communication system 200 may be implemented in a number of different ways. For example, some or all of the functionality of the aggregator station 215 and/or the data terminals 230 may be implemented in other components of the system, for example in the satellite 205. Further, many embodiments of aggregator stations 215 and data terminals 230 are possible according to the invention.

Figure 3:
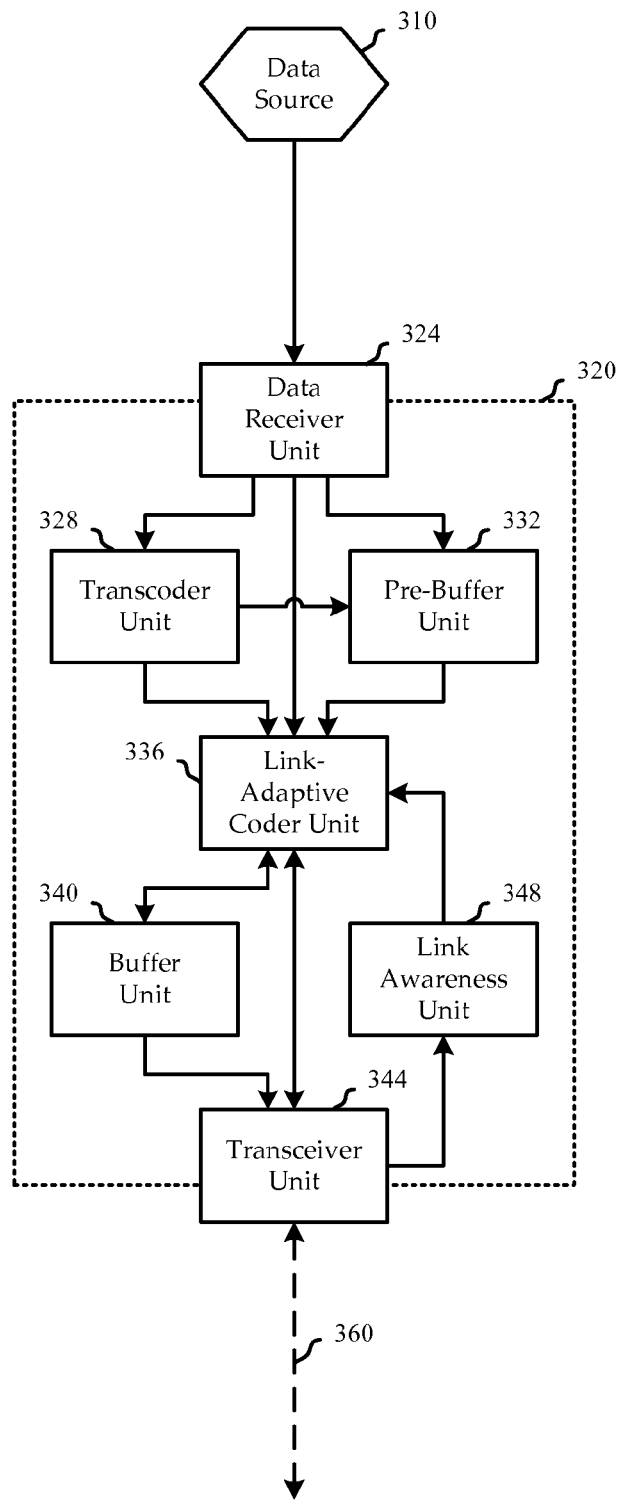
FIG. 3 provides a simplified block diagram of an embodiment of a data terminal, configured according to various embodiments of the invention.

FIG. 3 provides a simplified block diagram of an embodiment of a data terminal 320 configured according to various embodiments of the invention. In some embodiments, the data terminal 320 is similar to some or all of the mobile data terminals 120 of FIG. 1, the fixed data terminals 130 of FIG.

1, or the data terminals 230 of FIG. 2. It is worth noting that the functionality of the data terminal 320 may be implemented in any number of different ways.

In some embodiments, the data terminal 320 includes a receiver unit 324, a link-adaptive coder unit 336, and a transceiver unit 344. The data terminal 320 may receive a set of source data 310, process the source data 310 using various components (including the link-adaptive coder unit 336), and transmit the data over a communication link 360 using the transceiver unit 344.

In some embodiments, the data terminal 320 includes the receiver unit 324, which receives the set of source data 310. The set of source data 310 may include, for example, audio data, video data, voice data, or any other type of data. The receiver unit 324 may include any hardware, software, or other components necessary to receive the set of source data 310. For example, the receiver unit 324 may include amplifiers, buffers, ports, codecs, etc. In one embodiment, the set of source data 310 includes an audio-visual data stream, which is received by the receiver unit 324 from a data source (e.g., a network, a data store, etc.) through a data port. In another embodiment, the set of source data 310 is received live by the receiver unit 324 (e.g., via a camera, microphone, and/or other sensor device).

In some embodiments, the receiver unit 324 passes all or a portion of the set of source data 310 directly to the link-adaptive coder unit 336. In other embodiments, the receiver unit 324 passes all or a portion of the set of source data 310 to one or more intermediate components. In one embodiment, the source data 310 is received by the receiver unit 324 in an undesirable format (e.g., a format that is incompatible with certain functionality of the link-adaptive coder unit 336). It may be desirable to transcode the received source data 310 into a different format, using a transcoder unit 328, prior to passing the data to the link-adaptive coder unit 336.

In another embodiment, source data 310 may be received faster (or at a different time) than processing takes place by the link-adaptive coder unit 336 and/or the transcoder unit 328. For example, complex algorithms that may be used by the link-adaptive coder unit 336 may cause the link-adaptive coder unit 336 to process data more slowly than it is received by the receiver unit 324. As such, it may be desirable to buffer data as it is received. For this and other reasons, embodiments of the data terminal 320 may include a buffer unit 332 for buffering all or part of the received source data 310. Data may then be passed from the buffer unit 332 to the link-adaptive coder unit 336 for further processing.

After or while the link-adaptive coder unit 336 receives data, it may pre-code the data to generate sets of representation data. The sets of representation data may contain any type of information, including information extracted or adapted from the set of source data 310 that may be useful for generating a representation of the set of source data 310. For example, a set of representation data may contain enough information extracted from a source video stream to allow the generation of a lower-resolution version of the video stream. In another example, the set of representation data may include color or texture information, which may be added to other sets of representation data to generate an enhanced version of the source video stream.

In certain embodiments, the link-adaptive coder unit 336 applies certain pre-coding schemes, including scalable pre-coding schemes, data partitioning schemes, etc. In one embodiment, where the set of source data 310 includes an audio-visual data stream, the link-adaptive coder unit 336 may pre-code the audio-visual data stream into various hierarchical sets of representation data by using the scalable capabilities of the MPEG-4 standard. In another embodiment, where the set of source data 310 includes an audio-visual data stream, the link-adaptive coder unit 336 may pre-code the audio-visual data stream into various hierarchical sets of representation data by using the data partitioning capabilities of the H.264 adaptive video coding standard. Embodiments of pre-coding schemes are described more fully below.

In some embodiments, multiple pre-coding schemes may, in reality, be implemented as multiple functions of a single pre-coding scheme. In one embodiment, multiple scalable pre-coding schemes are implemented by using a single MPEG-4 pre-coding algorithm to generate multiple layers of output (i.e., the generation of a base layer and enhancement layers using MPEG-4 may be inextricably linked). In another embodiment, multiple data partitioning pre-coding schemes are implemented by using one data partitioning algorithm to slice the set of source data 310 into multiple data partitions. As such, it will be appreciated that phrases like "multiple pre-coding schemes" and "a first pre-coding scheme" should be broadly construed to encompass at least single pre-coding schemes capable of producing multiple different outputs.

Embodiments of the link-adaptive coder unit 336 may associate each set of representation data with a coding and modulation scheme. For example, a first set of representation data may correspond to first-level (e.g., low resolution) playback of the set of source data 310, and a second set of representation data may correspond to second-level (e.g., higher resolution, enhanced) playback of the same set of source data 310. The link-adaptive coder unit 336 may associate the first set of representation data with a lower order coding and modulation scheme (e.g., quadrature phase-shift keying with 1-to-4 forward error correction (QPSK 1/4)) to better ensure the transmission of data for at least first-level playback. The link-adaptive coder unit 336 may associate the second set of representation data with a higher order coding and modulation scheme (e.g., 8PSK 7/8), reducing the transmission reliability of less critical enhancements for savings in power and bandwidth. Embodiments of coding and modulation schemes are described more fully below.

In some embodiments, the link-adaptive coder unit 336 may be configured to tie the pre-coding functionality with the coding and modulation functionality. For example, certain parameters the link-adaptive coder unit 336 uses to pre-code the set of source data 310 may be determined at least partially by the choice of coding and modulation scheme. In one embodiment, the link-adaptive coder unit 336 determines a set of scaling parameters to use with a scalable pre-coding scheme to generate sets of representation data based on a determined coding and modulation scheme. In other embodiments, choices regarding pre-coding and/or coding and modulation schemes may depend partially or completely on a determination of a link condition.

In certain cases, it may be desirable to receive data representing certain link conditions for use by the link-adaptive coder unit 336. Some embodiments of the data terminal 320 include a link awareness unit 348 for receiving, generating, and/or interpreting link condition information. In certain embodiments, the link awareness unit 348 is adapted to test the communication link 360 to determine its link conditions. In other embodiments, the link awareness unit 348 is adapted to predict or otherwise analyze link conditions based on certain prior data, stored data, and/or algorithms. In still other embodiments, the link awareness unit 348 is adapted to receive information relating to link conditions from an external source (e.g., from the aggregator station 215 of FIG. 2 over the communication link 360 via the transceiver unit 344).

Certain embodiments of the link-adaptive coder unit 336 pass coded and/or modulated data directly to the transceiver unit 344. Other embodiments of the link-adaptive coder unit 336 pass coded and/or modulated data to a buffer unit 340 (e.g., any type of temporary or permanent data store). Data stored in the buffer unit 340 may then be passed to the transceiver unit 344. The transceiver unit 344 may process the data into one or more signals for transmission (e.g., by buffering or amplifying the data), and may pass the signal(s) to the communication link 360. The transceiver unit 344 may include any hardware, software, or other components necessary to transmit the signals or to interface with the communication link 360.

In some embodiments, data is transmitted by the transceiver unit 344 in various stages. For example, a first portion of the source data 310 may be transmitted at one time, while a second portion of the source data 310 (e.g., a portion of the source data 310 stored in the buffer unit 340) may be transmitted at a later time. In certain embodiments, certain, more critical elements of the source data 310 are encoded by the link-adaptive coder unit 336 using a first pre-coding scheme and transmitted by the transceiver unit 344 using a high-order coding and modulation scheme. Other, less critical elements of the received source data may be encoded by the link-adaptive coder unit 336 using a second pre-coding scheme and stored in the buffer unit 340. The stored data may then be transmitted only under certain link conditions or over a period of time.

Figure 4:
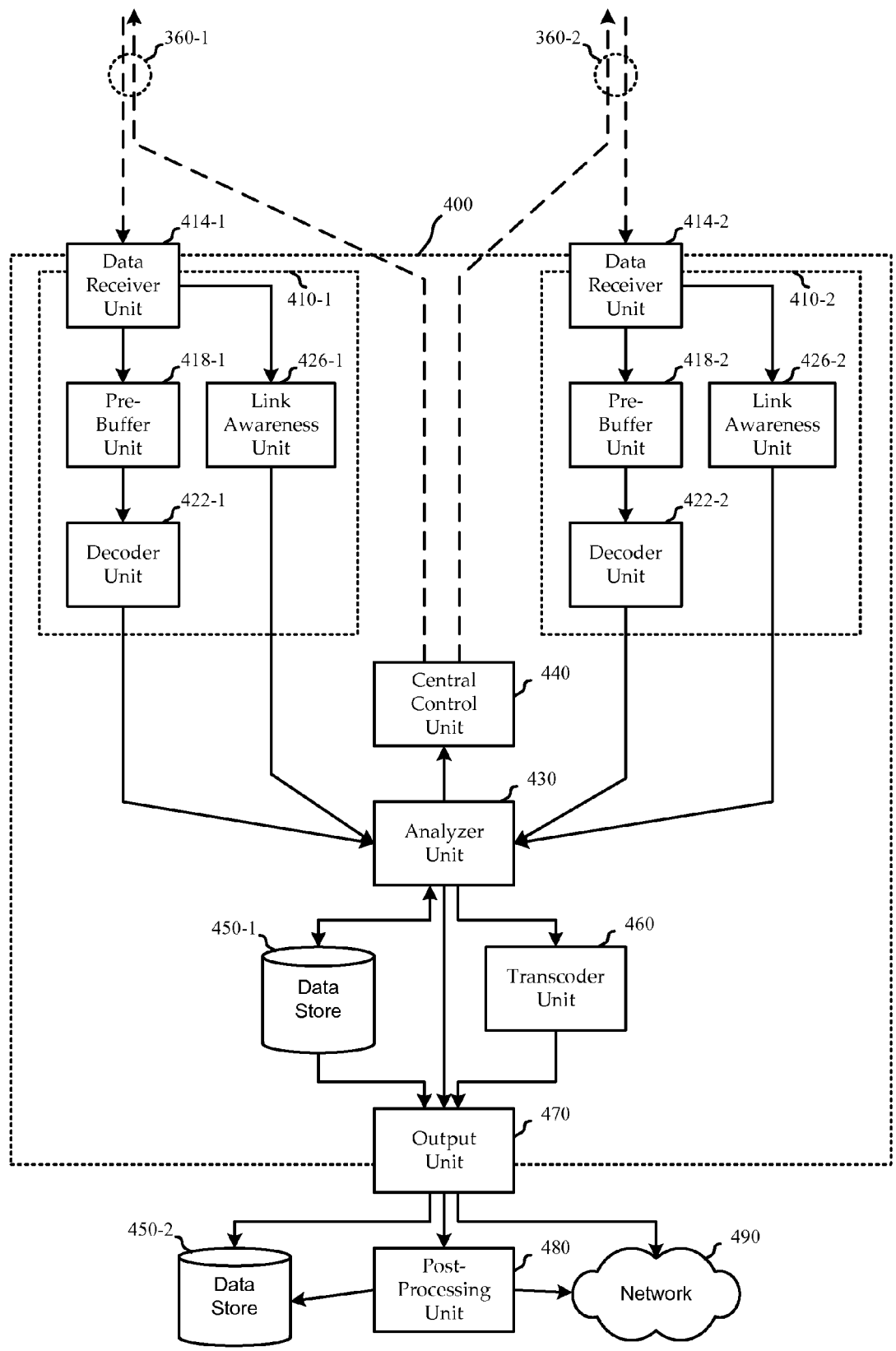
FIG. 4 provides a simplified block diagram of an embodiment of an aggregator terminal, according to various embodiments of the invention.

In these and other embodiments, signals are transmitted by the data terminal 320 over the communication link 360 to an aggregator terminal (e.g., like the aggregator terminal 215 in FIG. 2). FIG. 4 provides a simplified block diagram of an embodiment of an aggregator terminal, according to various embodiments of the invention. The aggregator terminal 400 may receive signals from one or more data terminals (e.g., the data terminal 320 of FIG. 3) over one or more communications links 360. Embodiments of the aggregator terminal 400 include multiple receiver units 414 for receiving data from the multiple communication links 360, and an analyzer unit 430 for processing (e.g., decode, aggregate, etc.) the signals.

In some embodiments, signals are received by the aggregator terminal 400 at multiple receiver units 414. Each receiver may be the same as or different from the receiver unit 324 of the data terminal 320 of FIG. 3. Each receiver units 414 is adapted to communicate with at least one data terminal via at least one communication link 360. It is worth noting that only a portion of the receiver units 414 may be used in certain cases. For example, an aggregator terminal 400 with eight receiver units 414 may be used to communicate with only two data terminals, possibly leaving six receiver units 414 unused.

In certain embodiments, one receiver unit 414 may be used to communicate with multiple data terminals. For example, data from multiple data terminals may be multiplexed over a single communication link 360 (e.g., by OFDM, TDMA, or in some other way), or multiple communication links 360 may share a single physical or logical interface (e.g., a wired or wireless communication link 360 may be logically or physically partitioned). In other embodiments, multiple receiver units 414 are used for communicating with a single data terminal. For example, a particular data terminal may send audio information to one receiver unit 414, video information to a second receiver unit 414, and location information (e.g., GPS coordinates) to a third receiver unit 414. For the sake of added clarity, the description will assume that each receiver unit 414 is in communication with a single data terminal over a single communication link 360.

In some embodiments, data received by the receiver units 414 is passed directly to the analyzer unit 430 for processing and/or other types of handling. In other embodiments, data received by the receiver units 414 may be pre-processed or stored for various reasons prior to being passed to the analyzer unit 430. In certain embodiments, a decoder unit 422 is provided in communication with each receiver unit 414 for decoding data received by the respective receiver unit 414. For example, each data terminal may send data to the aggregator terminal 400 with a different scheme for pre-coding and/or for coding and modulation. As such, it may be desirable to decode (e.g., decode, encode, transcode, etc.) the received data into a common format for use by the analyzer unit 430. Embodiments of the decoder units 422 may include any hardware, software, or other components helpful for decoding data in various conditions. For example, the decoder units 422 may have access to various error correction, de-multiplexing, formatting, and other functionality.

Embodiments of the aggregator terminal 400 may also include a pre-buffer unit 418 in communication with each receiver unit 414 for buffering data as it is received by the respective receiver unit 414. In certain embodiments, the pre-buffer unit 418 is adapted to compensate for any timing delays that may be created by processing incoming data by the decoder unit 422 and or the analyzer unit 430. In other embodiments, the aggregator terminal 400 includes one or more link awareness units 426 (e.g., in communication with some or all of the communication links 360). In certain embodiments, the link awareness units 426 may be similar to the link awareness unit 348 of FIG. 2. For example, a link awareness unit 426 may test one or more of the communication links 360 to determine a link condition of the communication link 360.

When data is received at the analyzer unit 430 (e.g., from one or more receiver units 414 or decoder units 422), the analyzer unit 430 may handle the data in a variety of ways. In some embodiments, the analyzer unit 430 is adapted to aggregate the data into an aggregate dataset. The data may be aggregated in many ways, according to different types of desired uses for the data. In one example, it is desirable to simply compile all the received data into a single location for future processing. In another example, data representing different portions of one set of source data (e.g., audio and video, multiple viewpoints, multiple levels of detail or definition, etc.) are received at multiple receiver units 414. In this example, aggregating the data may include combining and processing the data to generate a more complete representation of the source data. In yet another example, aggregating the data may include processing the incoming data (e.g., cutting and splicing video segments, overlaying audio from one feed onto video from another feed, inserting an advertisement from an advertisement server into a live streaming video feed, etc.).

In certain embodiments, the analyzer unit 430 is in communication with a data store 450-1. The data store 450-1 may be used to store all or part of the aggregate dataset generated by the analyzer unit 430. In some embodiments, the data store 450-1 is adapted to dynamically read, write, overwrite, and otherwise manage data. The data store 450-1 may further be adapted to provide data back to the analyzer unit 430 for further processing. For example, certain pre-coded layers of data may be received at a receiver unit 414, decoded by a decoder unit 422, and passed through (or aggregated by) the analyzer unit 430 to the data store 450-1. Subsequently, another pre-coded layer of the data may be received, and the analyzer unit 430 may retrieve the previously stored layers of data from the data store 450-1 for further aggregation with the new layer of data.

In some embodiments, the aggregated data is passed directly from the analyzer unit 430 to an output unit 470 for outputting the data from the aggregator terminal 400. In other embodiments, data is passed to the output unit 470 from the data store 450-1. In still other embodiments, data is passed to the output unit 470 from a transcoder unit 460 or other post-processing component. For example, if data is being output to a system requiring a particular data format or transmission protocol, it may be desirable to apply that format or protocol to the data before passing the data to the output unit 470. It is worth noting that the output unit 470 may include any components, interfaces, etc. for outputting the data to another system or device. For example, the output unit 470 may be adapted to output data to another data store 450-2 (e.g., a server, a drive, etc.), a post-processing unit 480 (e.g., a video editing system, a post-production system, etc.), or a network 490 (e.g., the Internet).

In some embodiments, the analyzer unit 430 receives link condition information from the link awareness unit(s) 426. The analyzer unit 430 may use the link condition information to keep track of or predict conditions relating to some or all of the communication links 360. For example, the link condition information may indicate that data integrity from a mobile terminal communicating over a first communication link 360-1 is quickly decreasing. In response, the analyzer unit 430 may take a preemptive action, like cutting the feed from that mobile data terminal, informing another system (e.g., a production or editing system, a human director, etc.) of the lack of data integrity, looking for a similar feed from a different data terminal with high data integrity, etc.

It will be appreciated that there are be many circumstances in which it may be desirable for the analyzer unit 430 to provide feedback and/or control to the data terminals. As such, some embodiments of the aggregator terminal 400 include a central control unit 440 for transmitting control signals to one or more data terminals in communication with the aggregator terminal 400. The control signals may be communicated to the data terminals by the central control unit 440 over the same or different communication links 360 as those being used to receive data at the aggregator terminal 400.

In one embodiment, link condition information received by the analyzer unit 430 and/or the response to that information by the analyzer unit 430 is used by the central control unit 440 to generate a control signal to one or more data terminals. The control signal may signal to the mobile data terminal that it is losing signal integrity, signal to another data terminal that it should begin covering for the deficiencies of the mobile data terminal, generate automated control data for refocusing a mobile data terminal, etc. In another embodiment, the analyzer unit 430 determines when there is a deficiency in the content of data (e.g., certain video angles are missing, certain levels of fidelity have not yet been received, etc.). The central control unit 440 may use the information to generate a control signal indicating to the data terminals what other information is desired. In certain embodiments, the central control unit 440 or the analyzer unit 430 determines how to remedy a data deficiency (e.g., from a lack of data integrity, a lack of content, etc.), and the central control unit 440 generates the control signal according to that determination. For example, by knowledge of the locations and angles of a set of remote mobile cameras, it may be possible for the analyzer unit 430 to determine how to re-point those cameras to fill in missing camera angles. The central control unit 440 may then generate control signals for remotely pointing the mobile cameras accordingly. It will be appreciated that the deficiency determinations may be made in many ways, including by using automated algorithms, artificial intelligence, or human interfacing.

It will now be appreciated that many embodiments and configurations of aggregator stations and data terminals are possible according to the invention. As discussed above, some embodiments of the aggregator stations and data terminals use certain schemes for pre-coding and/or coding and modulating data (e.g., as part of the functionality of the link-adaptive coder unit 336 of FIG. 3). These various schemes may be further understood with regard to various block diagrams, like those shown in FIGS. 5-9. The block diagrams are purely illustrative and should not be construed as limiting the scope of the invention.

Figure 5A:
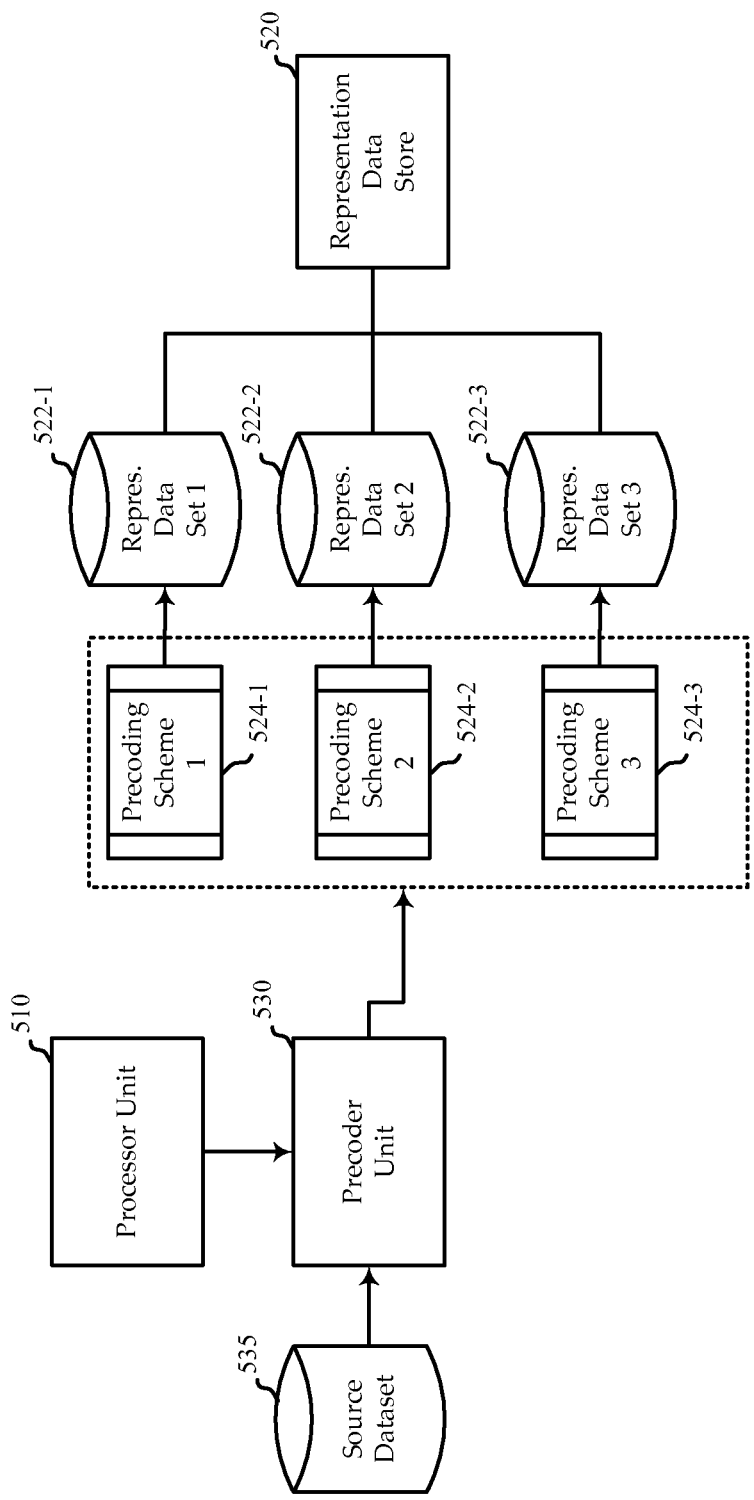
FIG. 5A shows a functional block diagram incorporating a pre-coder unit, according to various embodiments of the invention.

Turning to FIG. 5A, a functional block diagram incorporating a pre-coder unit, according to various embodiments of the invention, is provided. In some embodiments, a set of source data 535 passes to the pre-coder unit 530. The pre-coder unit 530 may pre-code the set of source data 535 using any number and/or type of pre-coding scheme 524.

Preferably, each pre-coding scheme 524 is different from each other pre-coding scheme 524 in some way, generating hierarchal (or layered or partitioned) output. Purely by way of example, some or all of the different pre-coding schemes 524 may use different codecs, parameters, transformations, transcoding, algorithms, and other techniques to affect resolution, quantization, bit rate, temporality, quality, spatiality, complexity, or any other useful characteristic of the data.

In some embodiments, the pre-coder unit 530 is communicatively coupled with a processor unit 510. In some embodiments, the processor unit 510 may be part of the controller unit 240 of FIG. 2. In other embodiments, the processor unit 510 may be incorporated into the pre-coder unit 530. In still other embodiments, the processor unit 510 may be implemented as a separate component or in any other useful way. In certain embodiments, the processor unit 510 may control all or part of the functionality of the pre-coder unit 530. For example, where the pre-coder unit 530 pre-codes the set of source data 535 based on certain parameters, the processor unit 510 may perform functions, including generating or selecting the parameters, instructing the pre-coder unit 530 to use the parameters, etc.

In one embodiment, three pre-coding schemes (524-1, 524-2, and 524-3) are used to generate three sets of representation data (522-1, 522-2, and 522-3), respectively. The three sets of representation data (522-1, 522-2, and 522-3) may correspond to three hierarchical layers of representation of the set of source data 535. Each of these sets of representation data 522 may be stored in a representation data store 520.

Figure 5B:
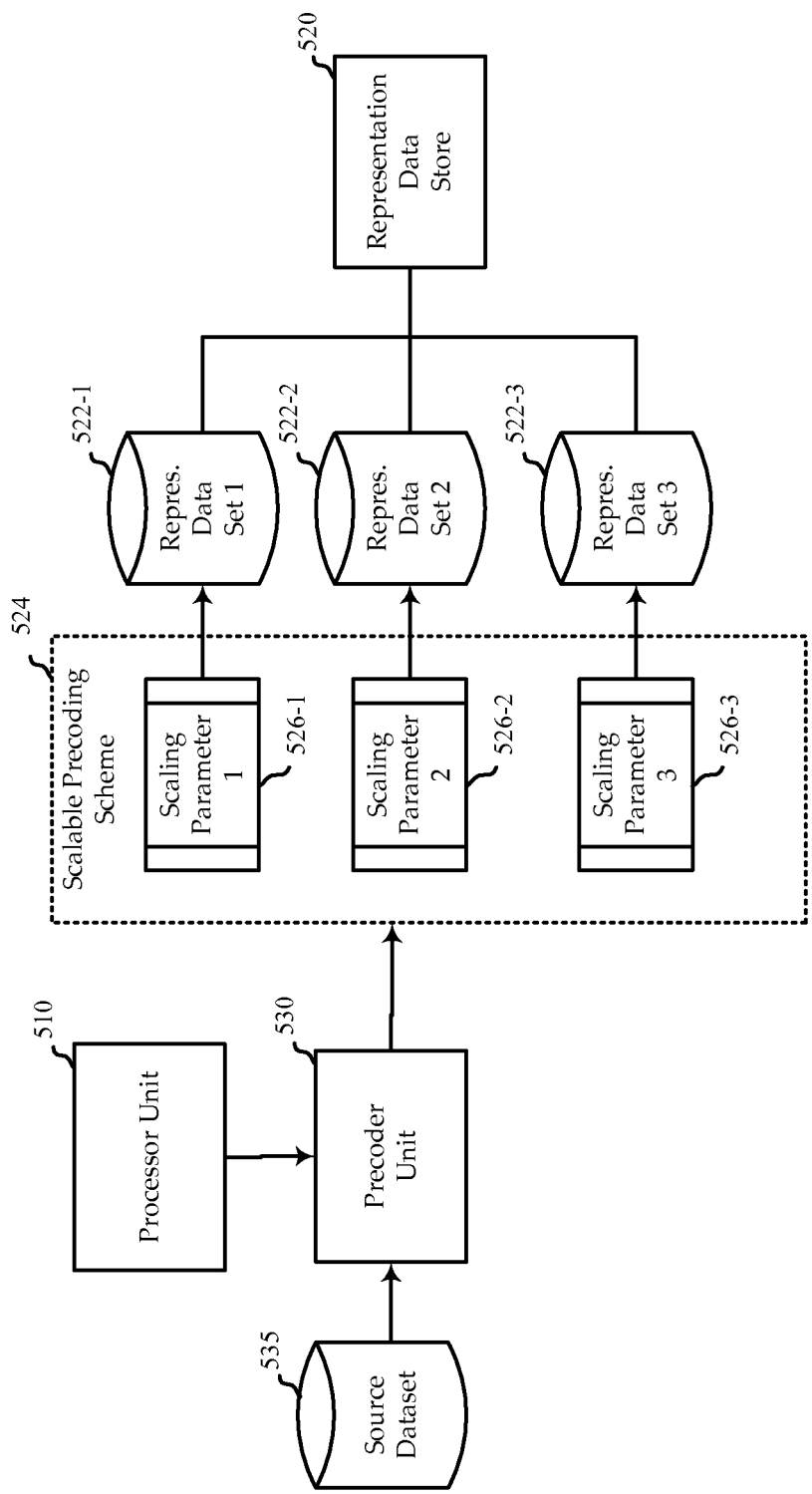
FIG. 5B provides a functional block diagram of a set of embodiments incorporating a pre-coder unit using scalable pre-coding schemes, according to various embodiments of the invention.
Figure 5C:
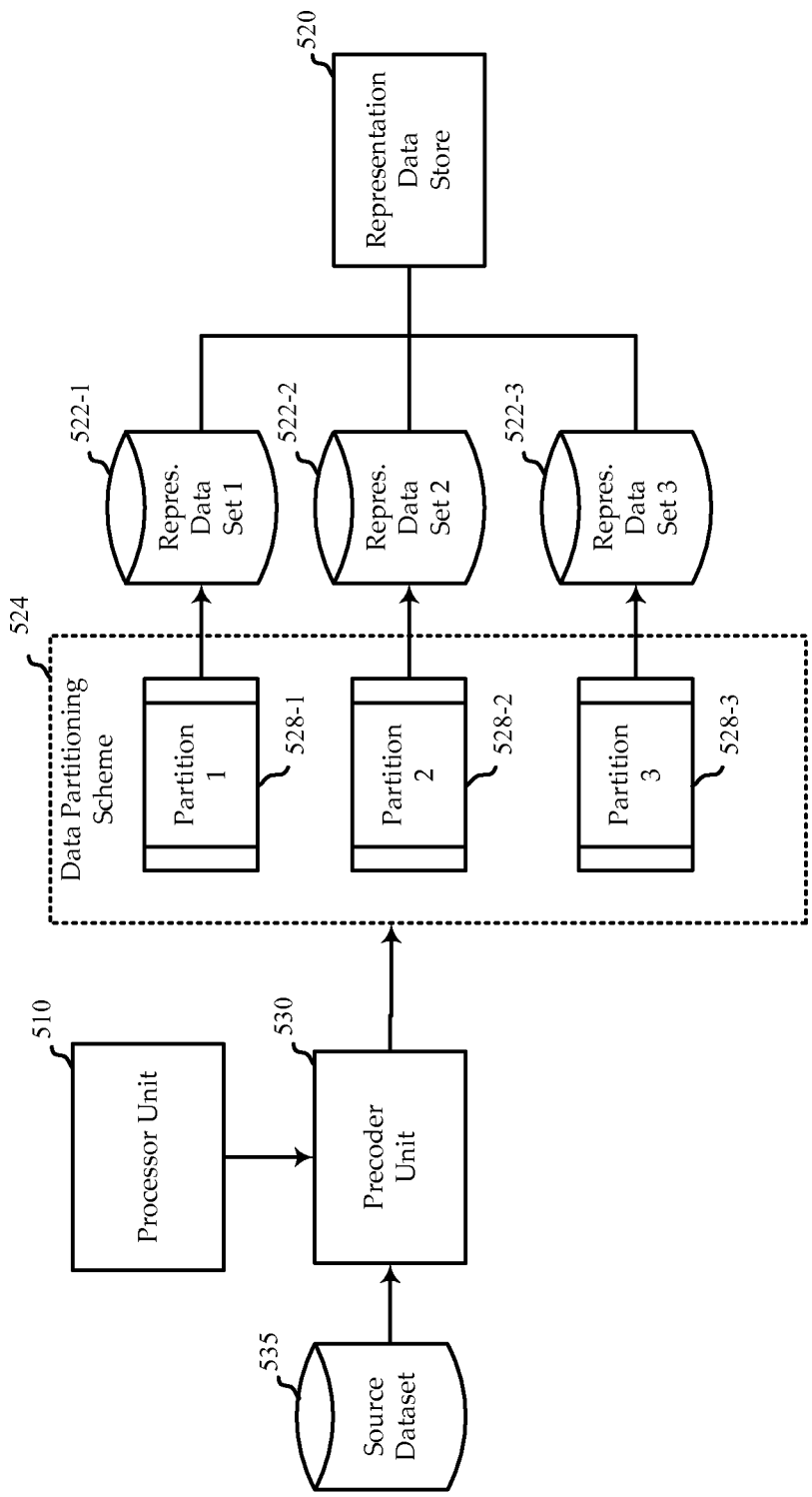
FIG. 5C provides a functional block diagram illustrating a set of embodiments of a pre-coder unit using data partitioning pre-coding schemes, according to various embodiments of the invention.
Figure 5D:
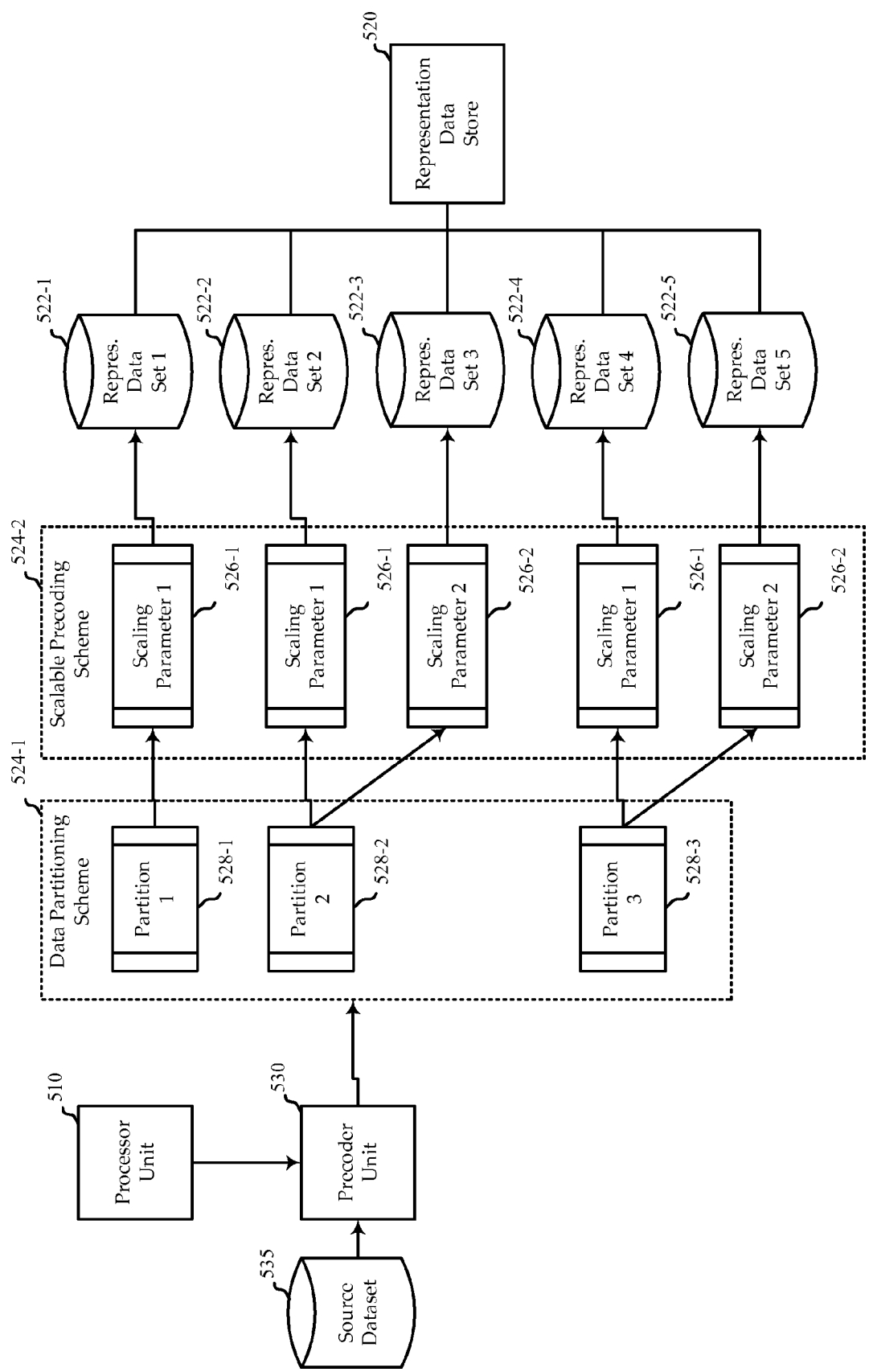
FIG. 5D provides functional block diagram of a set of embodiments incorporating a pre-coder unit using hybrid scalable and data partitioning pre-coding schemes, according to various embodiments of the invention.

Further embodiments of the functionality in FIG. 5A are illustrated in the exemplary functional block diagrams of FIGS. 5B-5D. FIG. 5B provides a functional block diagram of a set of embodiments incorporating a pre-coder unit 530 using scalable pre-coding schemes 524, according to various embodiments of the invention.

In this set of embodiments, a set of source data 535 passes to the pre-coder unit 530. The pre-coder unit 530 pre-codes the set of source data 535 using a scalable pre-coding scheme 524. Scalable pre-coding schemes 524 may divide the set of source data 535 into different hierarchical layers. In some embodiments, a first (lowest-level) layer is called the base layer and higher layers are called enhancement layers. A scalable pre-coding scheme 524 may intend to achieve graceful degradation of the picture quality. For example, by providing the capability to playback data at a number of different levels, the pre-coding scheme 524 may avoid suffering from the "all or nothing" effect observed in some non-scalable coding systems.

In some embodiments, the scalable pre-coding scheme 524 may exploit different compression techniques to produce bit streams that are decodable at different bit rates. In one embodiment, a base layer contains the most critical information for playback that is determined to be "good enough" for a consumer. In this embodiment, enhancement layers may contain less critical information, like higher color depths, texturing, or resolution. Using this pre-coding scheme 524, it may be possible to provide a consumer with more reliable access to the base layer, such that a "good enough" level of playback is almost always available.

It will be appreciated that various types of scalability may be used. Purely by way of example, scalabilities may include quality, temporal, spatial and complexity scalability, in order to accommodate heterogeneous networks, different devices, various link conditions, or other communication environments. Among these scalabilities, various spatial and temporal scalable pre-coding schemes 524 may be known in the art, such as MPEG-2, MPEG-4 and H.263++. In addition, certain fine-granularity scalable ("FGS") pre-coding schemes 524 may be known in the art. For example, MPEG-4 standard (Part-2) may incorporate a FGS technique with the pre-coder unit 530 using the motion-compensated discrete cosine transform (DCT) to generate a base layer as the lowest-level layer. Residual information between the original image and the reconstructed base layer image may be used to form one or more enhancement layers. An enhancement layer may be generated with a bit plane coding technique, which may provide fine granularity quality and temporal scalabilities.

Further, in certain embodiments, scalable pre-coding schemes 524 may provide error correction capabilities. For example, the MPEG-4 standard (Part-2) may be used to predict base layers and enhancement layers of future frames by using data from present frames. Using predicted data in the context of received data may allow correction of any bit stream truncation or lost packets, and may allow future frames to be more reliably recreated.

Regardless of the type or types of scalable pre-coding schemes 524 used, it may be preferable for each pre-coding scheme 524 to provide different scaling results for generating hierarchal output. Further, in some embodiments, the pre-coder unit 530 may be communicatively coupled with a processor unit 510, such that the processor unit 510 may control all or part of the functionality of the pre-coder unit 530. For example, the processor unit 510 may be configured to generate or select scaling parameters.

In one embodiment, one pre-coding scheme 524 is used with three scaling parameters (526-1, 526-2, and 526-3) to generate three sets of representation data (522-1, 522-2, and 522-3), respectively. The three sets of representation data (522-1, 522-2, and 522-3) may correspond to three hierarchical layers of representation of the set of source data 535. For example, the first set of representation data 522-1 may include base layer information, while the other two sets of representation data (522-2 and 522-3) may include enhancement layer information. Each of these sets of representation data 522 may be stored in a representation data store 520.

FIG. 5C provides a functional block diagram illustrating a set of embodiments of a pre-coder unit 530 using data partitioning pre-coding schemes 524, according to various embodiments of the invention. In this set of embodiments, a set of source data 535 passes to the pre-coder unit 530. The pre-coder unit 530 pre-codes the set of source data 535 using data partitioning pre-coding schemes 524. Data partitioning pre-coding schemes 524 may divide the set of source data 535 into different partitions.

Various data partitioning pre-coding schemes 524 may be known in the art. For example, data partitioning capabilities may be included in the H.264/AVC (adaptive video coding) standard. According to this standard, the pre-coder unit 530 may divide the set of source data 535 into three separate data partitions 528.

In one embodiment, three data partitions 528 may be defined to provide different levels of information representing the set of source data 535. A first partition 528-1 may contain syntax elements from header information within the set of source data 535, including macroblock types, quantization parameters, and motion vectors. A second partition 528-2 may contain intra-coded block patterns and transform coefficients. The second partition 528-2 may, for example, use various spatial prediction modes to exploit spatial statistical dependencies in the set of source data 535 for a single video frame. A third partition 528-3 may contain inter-coded block patterns and transform coefficients. The third partition 528-3 may, for example, use motion vectors for block based inter prediction to exploit block-shaped regions of each video frame in the set of source data 535.

The information contained in the first partition 528-1 (e.g., the header information of the set of source data 535) may represent a small portion of the set of source data 535, but it may be very critical to the recreation of the set of source data 535. For example, a "good enough" (or even a relatively high-quality) representation of the set of source data 535 may be recreated from only the information contained in the first partition 528-1, like macroblock types and motion vectors. On the contrary, information contained in the second partition 528-2 and the third partition 528-3 may be less critical while representing larger portions of the set of source data 535. Further information contained in the second partition 528-2 and the third partition 528-3 may be useful only in conjunction with information from the first partition 528-1.

It will be appreciated that other numbers and types of partitions are possible. Further, other steps may be required or desired as part of data partitioning pre-coding schemes 524. Regardless of the type or types of data partitions 528 used, it may be preferable for each pre-coding scheme 524 to use those data partitions 528 to provide hierarchal output. Further, in some embodiments, the pre-coder unit 530 may be communicatively coupled with a processor unit 510, such that the processor unit 510 may control all or part of the functionality of the pre-coder unit 530. For example, the processor unit 510 may be configured to generate or select data partitions 528.

In one embodiment, one data partitioning pre-coding schemes 524 is used with three data partitions 528 (528-1, 528-2, and 528-3) to generate three sets of representation data (522-1, 522-2, and 522-3), respectively. The three sets of representation data (522-1, 522-2, and 522-3) may correspond to three hierarchical partitions of the set of source data 535. For example, the first set of representation data 522-1 may include critical header information, while the other two sets of representation data (522-2 and 522-3) may include less critical intra- and inter-coded block patterns and transform coefficients. For example, using the H.264/AVC standard, the data partitions 528 may be encapsulated into separate network abstraction layer ("NAL") packets, which may be collated into the sets of representation data 522. Each of these sets of representation data 522 may be stored in a representation data store 520.

FIG. 5D provides functional block diagram of a set of embodiments incorporating a pre-coder unit 530 using hybrid scalable and data partitioning pre-coding schemes 524, according to various embodiments of the invention. In this set of embodiments, the pre-coder unit 530 pre-codes the set of source data 535 using a combination of scalable and data partitioning pre-coding schemes 524.

In various embodiments, the scalable pre-coding schemes 524-2 and the data partitioning pre-coding schemes 524-1 may be used in different orders to provide the same or different results. In one embodiment, the scalable pre-coding schemes 524-2 may create base and enhancement layers of the set of source data 535, and the data partitioning pre-coding schemes 524-1 may divide some or all of those layers into different partitions. In another embodiment, the data partitioning pre-coding schemes 524-1 may divide the set of source data 535 into a number of partitions, which may then be layered using the scalable pre-coding schemes 524-2.

It will be appreciated that various scalable and data partitioning pre-coding schemes 524 may be known in the art. Further, it will be appreciated that different types of pre-coding schemes 524 may manifest various drawbacks. For example, many data partitioning pre-coding schemes 524-1 (e.g., H.264/AVC) may lack flexibility in the creation of data partitions 528. Additionally, many scalable pre-coding schemes 524-2 (e.g., FGS) may degrade compression efficiencies. Some combinations of pre-coding schemes 524 may be able to minimize some of these drawbacks.

In the embodiment shown in FIG. 5D, a set of source data 535 passes to the pre-coder unit 530. The pre-coder unit 530 may use data partitioning pre-coding schemes 524-1 to divide the set of source data 535 into three data partitions (528-1, 528-2, and 528-3). The pre-coder unit 530 may then apply scalable pre-coding schemes 524-1 to each of the three data partitions (528-1, 528-2, and 528-3).

In one embodiment, H.264/AVC data partitioning pre-coding schemes 524-1 are used to generate the three data partitions (528-1, 528-2, and 528-3). For example, as described above with respect to FIG. 5C, the first partition 528-1 may contain critical header and other information, while the second partition 528-2 and the third partition 528-3 may contain less critical DCT information. Each of the three data partitions (528-1, 528-2, and 528-3) may then be passed to MPEG-4 scalable pre-coding schemes 524-2, configured with a first scaling parameter 526-1 and a second scaling parameter 526-2.

In this embodiment, the first partition 528-1 may be further pre-coded, using the first scaling parameter 526-1, thereby generating a first set of representation data 522-1. The second partition 528-2 may be further pre-coded into two layers, using both scaling parameters (526-1 and 526-2), thereby generating second and third sets of representation data (522-2 and 522-3). The third partition 528-3 may also be further pre-coded into two layers, using both scaling parameters (526-1 and 526-2), thereby generating fourth and fifth sets of representation data (522-4 and 522-5). It will be appreciated that further pre-coding the second and third data partitions (528-2 and 528-3) may create layers based on any useful characteristic of the partitioned data. For example, the base layers of the data partitions (e.g., what generated the second and fourth sets of representation data (522-2 and 522-4)), may contain coarsely quantized DCT coefficients, while the enhancement layers of the data partitions (e.g., what generated the third and fifth sets of representation data (522-3 and 522-5)), may contain refinement information from which a finer quantization can be obtained.

In some embodiments, the pre-coder unit 530 may be communicatively coupled with a processor unit 510, such that the processor unit 510 may control all or part of the functionality of the pre-coder unit 530. In certain embodiments, the processor unit 510 may be configured to generate or select data partitions 528. In other embodiments, the processor unit 510 may be configured to generate or select scaling parameters 526. In still other embodiments, the processor unit 510 may be configured to generate or select both data partitions 528 and scaling parameters 526. It will be appreciated that the processor unit 510 may be utilized in many ways to add capabilities and flexibility to the functionality of the pre-coder unit 530. For example, the data partitioning and layering may be adjusted flexibly according to system throughput requirements and link conditions. To achieve greater flexibility, the pre-coding schemes 524 may be configured to dynamically change numbers and types of data partitions 528, numbers and types of scaling parameters 526, etc.

In addition to the many functions and capabilities of the pre-coder unit 530, various embodiments may provide many different coding and modulation capabilities. FIG. 6 provides an illustration of an exemplary table of identifier data 622 for use with various embodiments of the invention. The entries in the table of identifier data 622 show some possible coding and modulation schemes 605 and their associated identifiers 610. It will be appreciated that many types of coding and modulation are possible according to the invention. As such, the coding and modulation schemes 605 listed in the table of identifier data 622 are for illustrative purposes only and should not be construed as limiting the scope of the invention.

Each identifier 610 is associated with a coding and modulation scheme 605. For example, identifier "1" 610-1 is associated with a first coding and modulation scheme 605-1, representing quadrature phase shift keying with a one-to-four forward error correction (FEC) rate (QPSK 1/4). In some embodiments, each identifier 610 may be a pointer to a set of information (e.g., an algorithm or a set of parameters) needed to implement its associated coding and modulation scheme 605.

According to the table of identifier data 622, a shift from identifier "1" 610-1 to identifier "4" 610-2 maintains the same modulation order (QPSK) while increasing the information density of the FEC (from 1/4 to 1/2). The coding and modulation scheme 605-2 associated with identifier "4" 610-2 generates half as many error correction bits for each information bit as does the coding and modulation scheme 605-1 associated with identifier "1" 610-1.

It will be appreciated that different implementations may use different types of coding and modulation schemes 605. It will further be appreciated that different tables of identifier data 622 may be configured to have different margins between the coding and modulation schemes 605 or to associate the identifiers 610 differently. For example, a table of identifier data 622 may include only every third entry shown on the table of identifier data 622 in FIG. 6. It will further be appreciated that the table of identifier data 622 may include other types of data for various reasons, like signal quality indicators (e.g., measured signal to noise ratio, estimated signal to noise ratio, bit error rate, received power level, etc.).

When link conditions are poor (e.g., low signal-to-noise ratio), lower order modulation schemes and low information densities may be required for reliable delivery of data. This may result in fewer data bits being sent per unit time as well as inefficient uses of power and bandwidth. When link conditions are good, higher order modulation schemes may be used with higher information density. This may allow more data bits to be sent per unit time with more efficient usage of power and bandwidth.

In many communication systems, the situation may be complicated by the fact that data is being sent to multiple subscribers with different characteristics (e.g., in different geographic locations, having different receiving capabilities, having different entitlement levels, etc.). When data packets are addressed to a single terminal (unicast), the packets may be sent using the most efficient coding and modulation scheme 605 that the communication link will support. However, when data packets are addressed to many receivers (multicast or broadcast), the packets may have to be sent using the coding and modulation scheme 605 that the receiver with the worst link in the group can support. When link conditions affect only a portion of the subscribers (e.g., a localized rain fade), this may result in inefficient network usage. Thus, link conditions may change dynamically per unit time, per subscriber, or based on other parameters.

By using certain adaptive coding and modulation (ACM) techniques, coding and modulation schemes 605 may be dynamically selected to match changing link conditions. In one embodiment, coding and modulation schemes 605 are selected by using the identifiers 610 and the table of identifier data 622. The coding and modulation schemes 605 are then encapsulated, coded, mapped, and transmitted in any of a variety of ways, as known in the art. ACM is then implemented using the DVB-S2 standard, which specifically provides for its use. It will be appreciated that other implementations are possible, for example, including systems using DOCSIS or WiMax.

In some embodiments, the table of identifier data 622 and any other related information may be stored in an identifier store 620. The identifier store 620 may store the table of identifier data 622 in any useful way. For example, the table of identifier data 622 may be hard-wired into a microchip, or stored as a flat file or a relational database.

Figure 7:
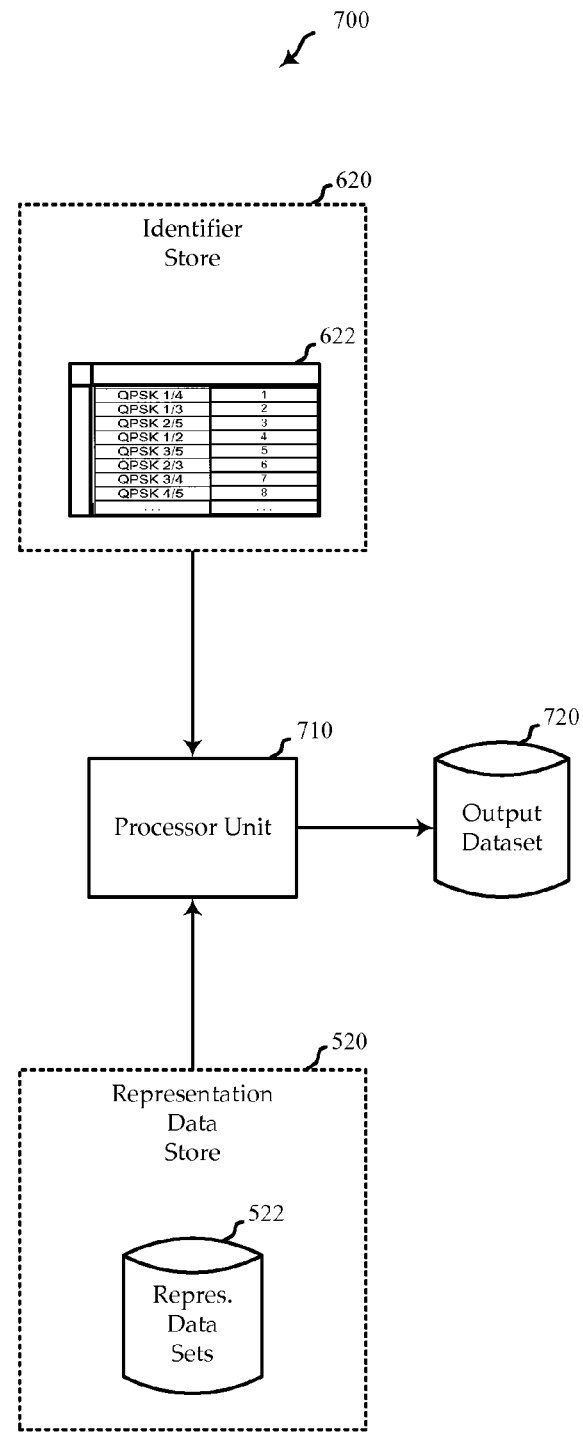
FIG. 7 provides a functional block diagram of a device incorporating a processor unit, a representation data store, and an identifier data store, according to various embodiments of the invention.

FIG. 7 provides a functional block diagram of a device 700 incorporating a processor unit 710, a representation data store 520, and an identifier data store 620 according to various embodiments of the invention. In some embodiments, the device may be or may include the controller unit 240 of FIG. 2.

In some embodiments, the processor unit 710 is communicatively coupled with the representation data store 520 and the identifier data store 620. The representation data store 520 may be configured to store sets of representation data 522 and the identifier data store 620 may be configured to store a table of identifier data 622. In certain embodiments, the processor unit 710 may be configured to process data from both the representation data store 520 and the identifier data store 620 to generate a set of output data 720. In other embodiments, the processor unit 710 may be configured to control at least a portion of the generation or processing of the data stored in either or both of the representation data store 520 and the identifier data store 620.

Figure 8A:
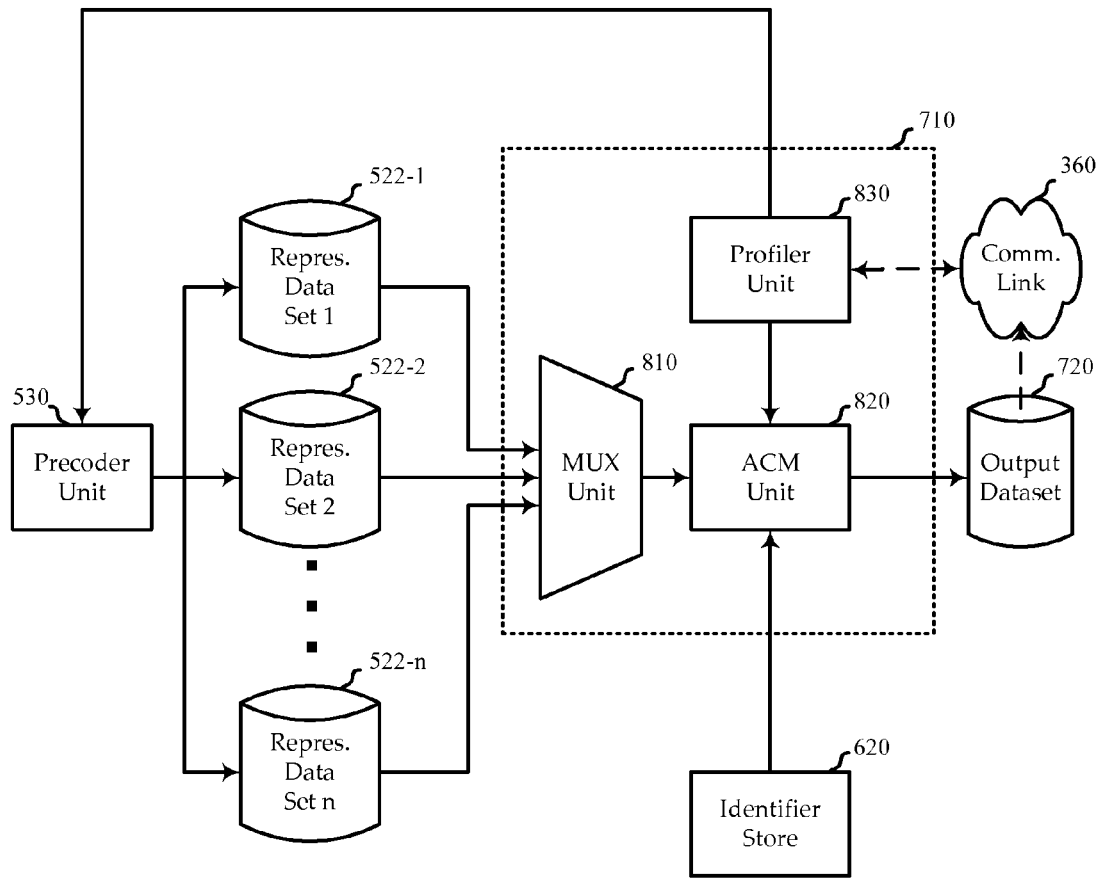
FIG. 8A provides a functional block diagram incorporating a processor unit, according to various embodiments of the invention.
Figure 8B:
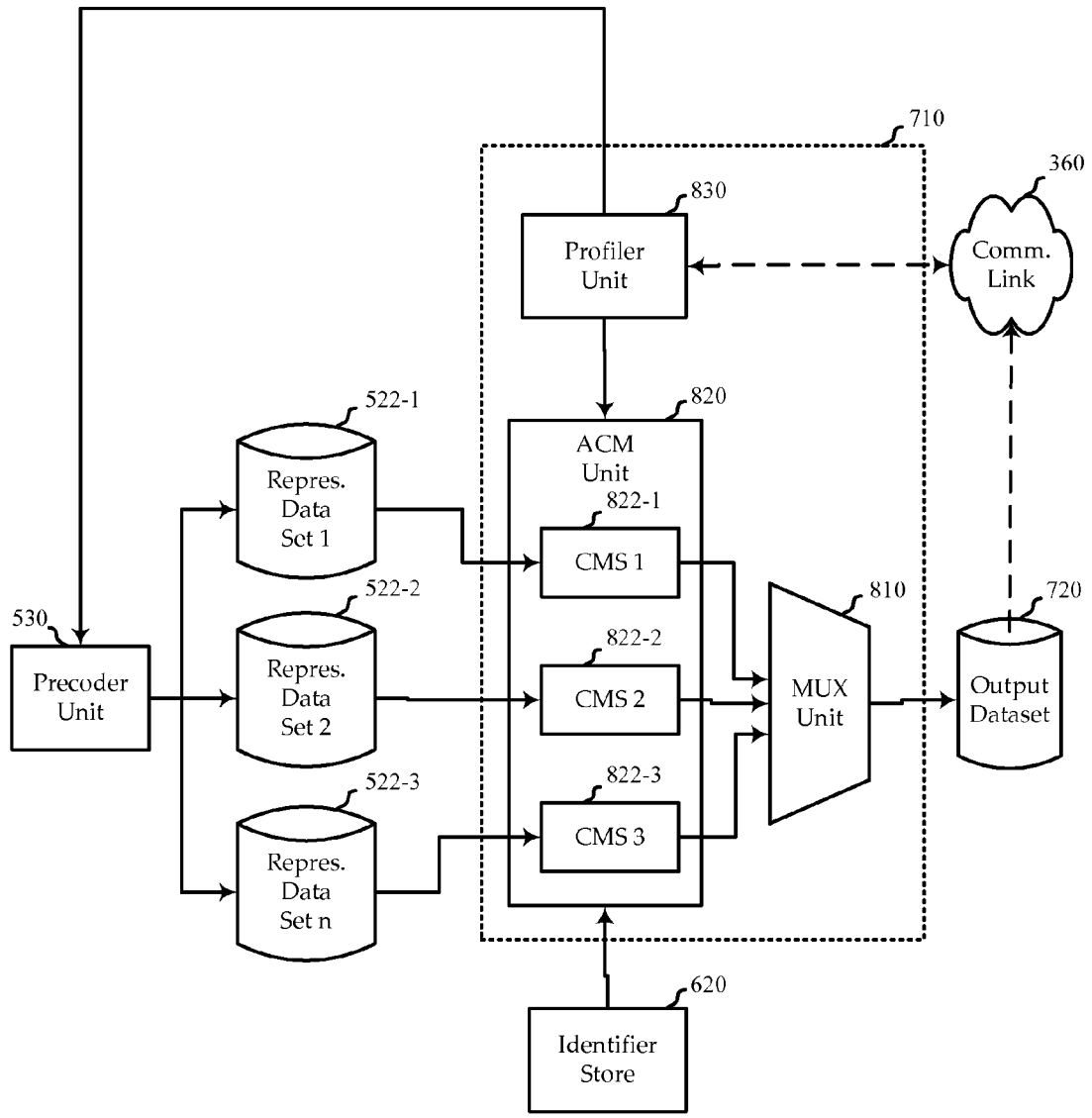
FIG. 8B, provides another functional block diagram incorporating a processor unit, according to various embodiments of the invention is provided.

The capabilities and functionality of the processor unit 710 are discussed further in FIGS. 8A and 8B. FIG. 8A provides a functional block diagram incorporating a processor unit 710, according to various embodiments of the invention. In some embodiments, the processor unit 710 is the same as or is part of the controller unit 240 of FIG. 2. The processor unit 710 may receive sets of representation data 522 from the pre-coder unit 530 and identifier data from the identifier data store 620.

In some embodiments, the processor unit 710 may receive sets of representation data 522 from the pre-coder unit 530. The sets of representation data 522 may pass through a multiplexer unit 810. The multiplexer unit 810 may multiplex the data in any useful way, for example, by time division multiplexing ("TDM"), frequency division multiplexing ("FDM"), wavelength division multiplexing ("WDM"), code division multiplexing ("CDM"), polarization, or any other effective technique.

The multiplexer unit 810 may be communicatively coupled with an ACM unit 820. The ACM unit 820 may be further communicatively coupled with an identifier data store 620 and configured to receive identifier data stored at the identifier data store 620. Using the identifier data, the ACM unit 820 may implement ACM on the multiplexed data coming from the multiplexer unit 810 to generate a set of output data 720.

In one embodiment, the ACM unit 820 is implemented as a single module, which is configured to accept only a single stream of data. In this embodiment, the purpose of the multiplexer unit 810 may be to produce serial data for use by the single-stream ACM unit 820. Packets of information belonging to sets of representation data 522 coming from the pre-coder unit 530 may be tagged with information that represents to which of the sets of representation data 522 each packet belongs. For example, packets of data may be appended with header information that includes a designator number representing a particular set of representation data 522. Using the tags, the multiplexer unit 810 may multiplex the data from the multiple sets of representation data 522 to produce a single stream of data for the ACM unit 820.

In another embodiment, the set of source data (not shown) received by the pre-coder unit 530 includes data for multiple source programs (e.g., multiple video streams). At times (e.g., when link conditions are substantially static), the pre-coder unit 530 may be configured to pre-code each of the multiple source programs into the same sets of representation data 522, using the same pre-coding schemes. For example, a set of source data for a first program and a set of source data for a second program may each be pre-coded into a base layer and an enhancement layer. The multiplexer unit 810 may multiplex the two base layers (i.e., one from each program) into one data stream and multiplex the two enhancement layers into a second data stream. The two data streams each may then pass to the ACM unit 820.

In some embodiments, the ACM unit 820 generates a set of output data 720. The set of output data 720 may include one or more signals configured to be transmitted over a communication link 260. The signal or signals may be coded and/or modulated as dictated by the ACM unit 820. Further, the signal or signals may be coded and/or modulated in any additional way or combination of ways for transmission over the communication link 260. It will be appreciated that one or more signals may not be included in the set of output data. For example, at times when insufficient bandwidth is available for sending multiple signals, the output data may include only one signal or only one set of representation data 522.

It will be appreciated that the processor unit 710 may be configured in different ways according to the invention. For example, turning to FIG. 8B, another functional block diagram incorporating a processor unit, according to various embodiments of the invention, is provided. In the embodiments of FIG. 8B sets of representation data 522 coming from the pre-coder unit 530 pass through the ACM unit 820 before they are multiplexed by the multiplexer unit 810. Three sets of representation data (522-1, 522-2, and 522-3) may pass to the ACM unit 820. The ACM unit 820 may then use three coding and modulation schemes (822-1, 822-2, and 822-3), one on each of the three sets of representation data (522-1, 522-2, and 522-3). The three coding and modulation schemes (822-1, 822-2, and 822-3) may generate three output signals, which are multiplexed by the multiplexer unit 810 to generate a set of output data 720 containing a single multiplexed signal. This signal may then be transmitted over the communication link 260.

Other configurations may also be possible according to the invention. In some embodiments, the ACM unit 820 may include a channel coding unit and a modulation unit. In one embodiment, each of the channel coding unit and the modulation unit may be independently controllable or may be configured to work in conjunction with one another. In another embodiment, the multiplexer unit 810 may multiplex multiple streams of data coming from the channel coding unit with different coding schemes and pass them as a single stream of data to the modulation unit.

Returning to FIG. 8A, in one embodiment, sets of representation data 522 are generated by the processor unit 710 using scalable pre-coding schemes. The sets of representation data 522 may then include a base layer and one or more enhancement layers. The layers may be multiplexed in the multiplexer unit 810 before being passed to the ACM unit 820. The ACM unit 820 may then use DVB-S2 to apply a QPSK 1/2 coding and modulation scheme to the multiplexed data, thereby generating a QPSK 1/2 signal for transmission over the communication link 260.

In some embodiments, the ACM unit 820 is further communicatively coupled to a profiler unit 830. The profiler unit 830 may be communicatively coupled with the communication link 260 and the pre-coder unit 530. The profiler unit 830 may also be configured to determine certain communication link profiles relating to the communication link 260. It will be appreciated that the profiler unit 830 may generate communication link profiles by detecting or receiving data intrinsic to and/or extrinsic to the communication link 260, by receiving information from other systems or components, or in any other useful way.

In one embodiment, the profiler unit 830 periodically or continuously determines signal-to-noise ratios ("SNRs") relating to the communication link 260 for use as communication link profiles. For example, the profiler unit 830 may sample signals received at one end of the communication link 260 to determine the SNRs of the signals. Further, the SNRs may be recorded for statistical processing (e.g., to determine average SNRs or to determine SNR by signal type), for logging (e.g., to keep a record of SNRs at different times of day or in different link conditions), or for other reasons. It will be appreciated that the SNRs may be detected at either end of the communication link 260 (e.g., at either the aggregator station end or the subscriber terminal end) and by any effective method.

In another embodiment, the profiler unit 830 determines the bandwidth of the communication link 260 to generate a communication link profile. Similarly, the bandwidth of the communication link 260 may be provided to the profiler unit 830 manually or by another component, either before or when the communication link profile is generated. It will be appreciated that many other useful characteristics may be detected from the communication link 260 to generate communication link profiles, including, for example, throughput, hop count, path length, physical latency, bit error rate, power consumption, power availability, excess bandwidth, traffic congestion, etc.

In yet another embodiment, the profiler unit 830 determines an audience metric, which may be used as a communication link profile. There may be many ways to determine an audience metric. For example, the audience metric may be determined by detecting the number of subscribers receiving a signal, the number of subscribers playing back the signal (e.g., watching the video data), polling subscribers to determine the number of subscribers planning to playback the signal. In some embodiments, the signal may include multicast information (information transmitted to subscribers who have joined the multicast stream). In those embodiments, the audience metric may relate to the number or type of subscribers who have joined the multicast stream.

In still another embodiment, the profiler unit 830 may determine or receive a receiver capability, which may be used as a communication link profile. In some embodiments, a subscriber terminal 230 may include a receiver for receiving signals from the communication link 260. The receiver may have limited capabilities, due to limitations, for example, in a port or antenna, in a playback mechanism, in a decoding mechanism, etc. For example, a subscriber may be receiving video signals on a mobile phone. The phone may have a small screen with limited resolution, a small antenna with limited range, a small battery with limited power, etc.

In even another embodiment, the profiler unit 830 may determine or receive authorization to transmit signals over the communication link 260 in certain ways, which may be used as a communication link profile. In some embodiments, subscribers may have accounts with a service provider, which are associated with certain entitlement information. For example, a subscriber may be able to purchase a base package, which entitles the subscriber to receive and/or playback only base layer information generated by a scalable pre-coding scheme (e.g., a low-resolution video). Other subscribers may be able to purchase the additional entitlement to receive and/or playback enhanced layers (e.g., a high-definition video). In other embodiments, other parties may be at least partially responsible for the generation of the communication link profiles. For example, a backbone provider may allocate certain bandwidths to certain applications at certain times of the day.

In some embodiments, the profiler unit 830 is communicatively coupled with either or both of the ACM unit 820 and the pre-coder unit 530. Thus, in certain embodiments, the profiler unit 830 may use communication link profiles to determine certain parameters of pre-coding schemes used by the pre-coder unit 530 (e.g., scaling parameters, data partitions, etc.), or to assign identifiers to appropriate coding and modulation schemes. In other embodiments, the profiler unit 830 may generate, modify, or otherwise influence the functionality of both the ACM unit 820 and the pre-coder unit 530 in other ways to best suit data to various communication link profiles.

In an embodiment where the profiler unit 830 generates communication link profiles using an audience metric, different audience metrics may be used in different ways. For example, the bandwidth required for a popular program may be permitted to increase at the expense of less popular programs. To this effect, the popular program may be encoded at a high bit rate, and sent using a very low order (reliable) modulation and coding scheme. Alternately, the least popular programs may be encoded at a low bit rate, and sent using a high order modulation and coding scheme. In a satellite communication system according to this embodiment, one result may include an improved balance between the overall fixed bandwidth of the satellite transponder and service quality and availability.

In another embodiment, the profiler unit 830 generates communication link profiles at least in part based on weather patterns. As the weather worsens, link conditions may also worsen, decreasing the reliability of data transfers over the communication link 260. To compensate for worsening conditions, the profiler unit 830 may direct the ACM unit 820 to increase transmission reliability by using higher order coding and modulation schemes (e.g., higher order modulation schemes, lower information density, etc.). The change in coding and modulation schemes may be implemented, for example, by assigning identifiers to higher order coding and modulation schemes in a table like the identifier data table 622 of FIG. 6. The new assignments in the table may then be used by the ACM unit 820 to generate the set of output data 720 for transmission.

In yet another embodiment, the profiler unit 830 generates communication link profiles at least in part based on notifications generated by a subscriber terminal 230. As discussed above with reference to FIG. 3, embodiments of data terminals 230 may be configured to provide notices on certain conditions. For example, a subscriber terminal 230 may be configured to store received and decoded sets of representation data 522 for later playback by a subscriber. The subscriber terminal 230 may provide notifications, for example, when certain sets of representation data 522 failed to be reliably received (e.g., and must be resent), when subscribers request or subscribe to certain sets of representation data 522, etc. In these and other cases, the profiler unit 830 may receive a notification and generate communication link profiles to respond to those notifications. For example, if a set of representation data 522 failed to be received, the set of representation data 522 may be retransmitted using a more reliable coding and modulation scheme.

In still another embodiment, the profiler unit 830 may generate communication link profiles based on a variety of different types of data. For example, the profiler unit 830 may receive a notification from a subscriber terminal 230 requesting retransmission of a set of representation data 522. The profiler unit 830 may poll the communication link 260 to determine its bandwidth, waiting to detect that excess bandwidth is available. When excess bandwidth is available on the communication link 260, the profiler unit 830 may direct the ACM unit 820 to retransmit the requested set of representation data 522 using a very reliable (but bandwidth inefficient) coding and modulation scheme.

Figure 9A:
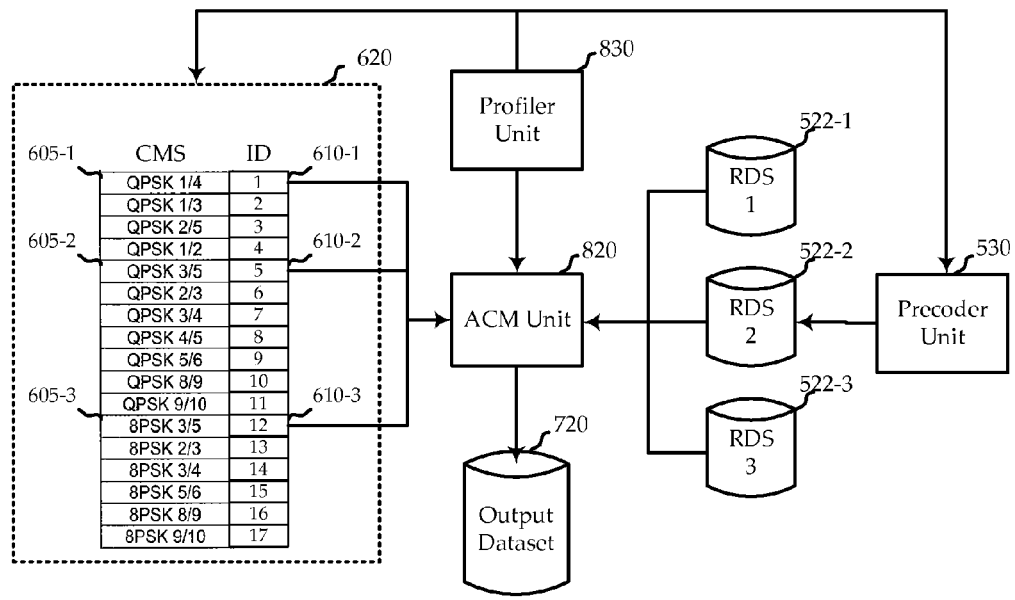
FIG. 9A provides an exemplary embodiment illustrating adapting coding and modulation schemes to link conditions, according to various embodiments of the invention.
Figure 9B:
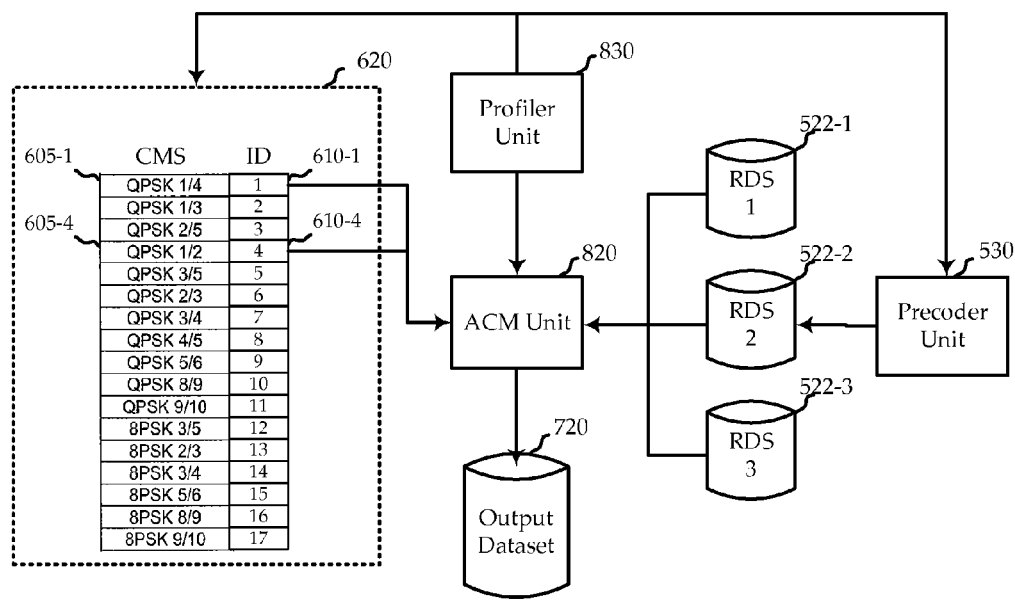
FIG. 9B provides another exemplary embodiment illustrating adapting coding and modulation schemes to link conditions, according to various embodiments of the invention.

FIG. 9A and FIG. 9B provide an exemplary embodiment illustrating adapting coding and modulation schemes to link conditions according to various embodiments of the invention. In FIG. 9A, three sets of representation data (522-1, 522-2, and 522-3) pass from a pre-coder unit 530 to an ACM unit 820. Based on information provided by the profiler unit 830, identifiers 610 have been assigned to coding and modulation schemes 605 in an identifier data store 620.

As illustrated, the first set of representation data 522-1 is associated with identifier "1" 610-1, which is further identified with a QPSK 1/4 coding and modulation scheme 605-1. The second set of representation data 522-2 is associated with identifier "2" 610-2, which is further identified with a second coding and modulation scheme 605-2. The second coding and modulation scheme 605-2 represents the same order modulation scheme (i.e., QPSK) as the first coding and modulation scheme 605-1, but with higher information density (i.e., 3/5 provides fewer error correction bits per information bit than 1/4). The third set of representation data 522-3 is associated with identifier "3" 610-3, which is further identified with a third coding and modulation scheme 605-3. The third coding and modulation scheme 605-3 represents a higher order modulation scheme than the first coding and modulation scheme 605-1 (i.e., 8PSK instead of QPSK), but with the same information density (i.e., 3/5). Thus, the first set of representation data 522-1 may be transmitted with the highest reliability, relative to the other sets of representation data (522-2 and 522-3).

FIG. 9B illustrates the same embodiment of the invention, illustratively adapted to worsening link conditions. Still, three sets of representation data (522-1, 522-2, and 522-3) pass from a pre-coder unit 530 to an ACM unit 820. Here, however, the profiler unit 830 has detected worsening link conditions (e.g., heavy rain). In response, identifiers 610 have been reassigned to more reliable coding and modulation schemes 605 in the identifier data store 620.

As illustrated, the first set of representation data 522-1 is still associated with identifier "1" 610-1, which is still further identified with a QPSK 1/4 coding and modulation scheme 605-1. No change is made to these assignments, as the QPSK 1/4 coding and modulation scheme is the most reliable option provided in the identifier data store 620. However, the second set of representation data 522-2 associated with identifier "2" 610-2 is now further associated with a new coding and modulation scheme 605-4 (QPSK 1/2). The new coding and modulation scheme 605-4 represents the same order modulation scheme (i.e., QPSK) as the second coding and modulation scheme 605-2 used in FIG. 9A, but with lower information density (i.e., 1/2 instead of 3/5). Further, the third set of representation data 522-3 is re-associated with identifier "2" 610-2, further associating the third set of representation data 522-3 with the same new coding and modulation scheme 605-4 as is associated with the second set of representation data 522-2. Now, the first set of representation data 522-1 may still be transmitted with the highest reliability, but the other sets of representation data (522-2 and 522-3) will also be more reliably transmitted.

Figure 10:
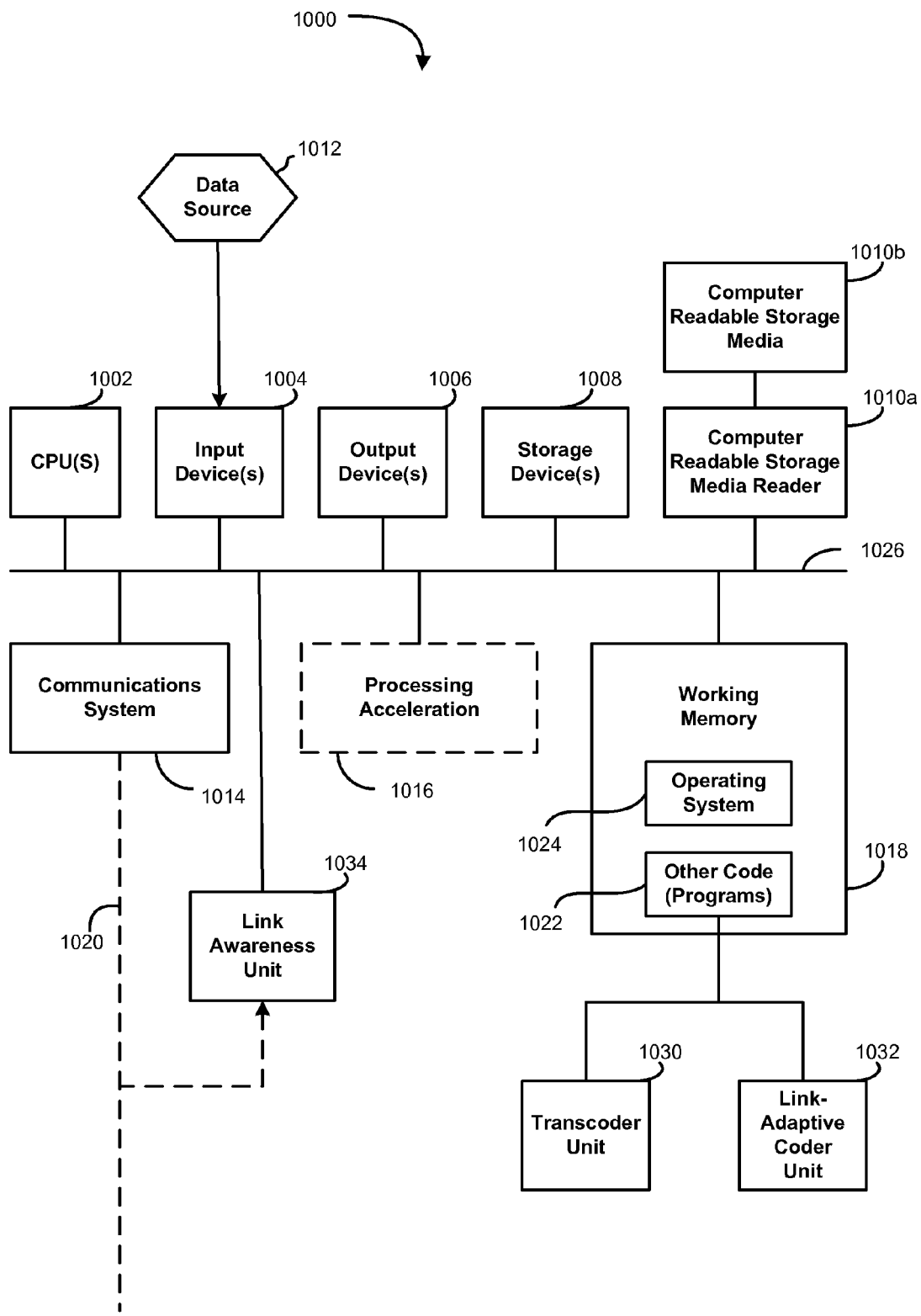
FIG. 10 shows an illustrative computational system for providing link aware communications in over communication links with changing link conditions, according to various embodiments of the invention.

The features of the various embodiments of FIGS. 1-9 may be implemented in a number of ways according to the invention. Further, the components and functionalities in those figures may be used to perform a number of different methods according to the invention. FIG. 10 shows an illustrative computational system for providing link aware communications in over communication links with changing link conditions, according to various embodiments of the invention.

The computational system 1000 is shown having hardware elements that may be electrically coupled via a bus 1026 (or may otherwise be in communication, as appropriate). The hardware elements may include one or more processors 1002, including without limitation one or more general-purpose processors and/or one or more special-purpose processors (e.g., digital signal processing chips, graphics acceleration chips, encoding/decoding/transcoding chips, and/or the like); one or more input devices 1004 (e.g., a mouse, a keyboard, a camera, a microphone, a sensor, and/or the like); and one or more output devices 1006 (e.g., a display device, a printer, indicators, and/or the like). In some embodiments, a link awareness unit 1034 is coupled to the bus 1026, or is otherwise accessible by other components of the computational system 1000. In some embodiments, the link awareness unit 1034 provides similar functionality to the link awareness unit 348 of FIG. 3.

The computational system 1000 may further include (and/or be in communication with) one or more storage devices 1008, which can comprise, without limitation, local and/or network accessible storage and/or can include, without limitation, a disk drive, a drive array, an optical storage device, a solid-state storage device such as a random access memory ("RAM"), and/or a read-only memory ("ROM"), which can be programmable, flash-updateable, and/or the like.

The computational system 1000 might also include a communications subsystem 1014, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 1014 may permit data to be exchanged with a communication link 1020 (e.g., like the communication link 360 of FIG. 3), and/or any other devices described herein. In many embodiments, the computational system 1000 will further comprise a working memory 1018, which can include a RAM or ROM device, and/or one or more buffers, as described above.

The computational system 1000 also may include software elements, shown as being currently located within the working memory 1018, including an operating system 1024 and/or other code, such as one or more application programs 1022, which may include computer programs of the invention, and/or may be designed to implement methods of the invention and/or configure systems of the invention, as described herein. For example, the application programs 1022 may include functionality to implement some or all of the aspects of a transcoder unit 1030 (e.g., like the transcoder unit 328 of FIG. 3) and/or a link-adaptive coder unit 1032 (e.g., like the link-adaptive coder unit 336 of FIG. 3). It is worth noting, that any of the functionality described as software elements may additionally or alternatively be implemented in firmware, hardware, or other implementations. For example, the link-adaptive coder unit 1032 may be alternatively implemented as an application-specific functional block electrically coupled with the bus 1026.

Merely by way of example, one or more procedures described with respect to the method(s) discussed above might be implemented as code and/or instructions executable by a computer (and/or a processor within a computer). A set of these instructions and/or code might be stored on a computer readable storage medium 1010*b*. In some embodiments, the computer readable storage medium 1010*b* is the storage device(s) 1008 described above. In other embodiments, the computer readable storage medium 1010*b* might be incorporated within a computational system, such as the system 1000. In still other embodiments, the computer readable storage medium 1010*b* might be separate from the computational system (i.e., a removable medium, such as a compact disc, etc.), and/or provided in an installation package, such that the storage medium can be used to configure a general purpose computer with the instructions/code stored thereon. These instructions might take the form of executable code, which is executable by the computational system 1000 and/or might take the form of source and/or installable code, which, upon compilation and/or installation on the computational system 1000 (e.g., using any of a variety of generally available compilers, installation programs, compression/decompression utilities, etc.), then takes the form of executable code. In these embodiments, the computer readable storage medium 1010*b* may be read by a computer readable storage media reader 1010*a*.

In one embodiment, the invention employs the computational system to perform methods of the invention. According to a set of embodiments, some or all of the procedures of such methods are performed by the computational system 1000 in response to processor 1002 executing one or more sequences of one or more instructions (which might be incorporated into the operating system 1024 and/or other code, such as an application program 1022) contained in the working memory 1018. Such instructions may be read into the working memory 1018 from another machine-readable medium, such as one or more of the storage device(s) 1008 (or 1010). Merely by way of example, execution of the sequences of instructions contained in the working memory 1018 might cause the processor(s) 1002 to perform one or more procedures of the methods described herein. In this way, the computational system 1000 can be "configured to," "operable to," and/or "adapted to" perform any number of such procedures or methods.

The terms "machine readable medium" and "computer readable medium," as used herein, refer to any medium that participates in providing data that causes a machine to operate in a specific fashion. In an embodiment implemented using the computational system 1000, various machine-readable media might be involved in providing instructions/code to processor(s) 1002 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (1008 or 1010). Volatile media includes, without limitation dynamic memory, such as the working memory 1018. Transmission media includes coaxial cables, copper wire, and fiber optics, including the wires that comprise the bus 1026, as well as the various components of the communication subsystem 1014 (and/or the media by which the communications subsystem 1014 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1002 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 1000. These signals, which might be in the form of electromagnetic signals, acoustic signals, optical signals, and/or the like, are all examples of carrier waves on which instructions can be encoded, in accordance with various embodiments of the invention.

The communications subsystem 1014 (and/or components thereof) generally may receive the signals, and the bus 1026 then may carry the signals (and/or the data, instructions, etc. carried by the signals) to the working memory 1018, from which the processor(s) 1002 may retrieve and execute the instructions. The instructions received by the working memory 1018 may optionally be stored on a storage device 1008 either before or after execution by the processor(s) 1002.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 11:
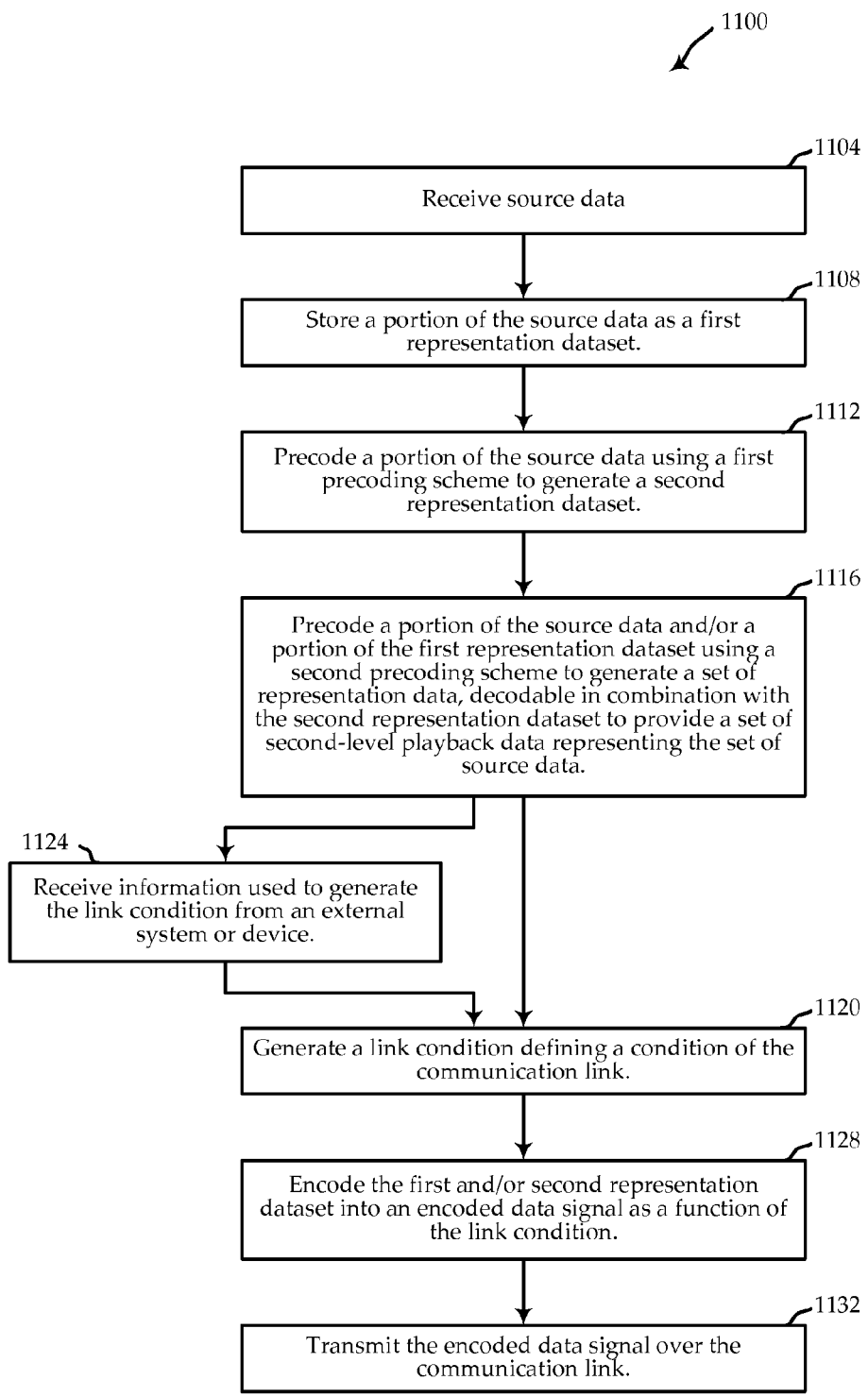
FIG. 11 provides a flow diagram describing methods for receiving source data and transmitting the source data over a communication link having changing link conditions, according to various embodiments of the invention.

It will be appreciated that various methods are possible, according to various embodiments of the invention. In some embodiments, the methods may be implemented by one or more systems, including but not limited to those described above. FIG. 11 provides a flow diagram describing methods for receiving source data and transmitting the source data over a communication link having changing link conditions, according to various embodiments of the invention.

The method 1100 begins at block 1104 by receiving source data from a data source. At block 1108, a portion (e.g., some or all) of the source data is stored as a first representation dataset representing the source data. At least a portion of the source data may be pre-coded at block 1112 using a first pre-coding scheme to generate a second representation dataset. The second representation dataset may be decodable to provide a set of first-level playback data representing the source data. Typically, the second representation dataset may be different from the first representation dataset. In some embodiments, a portion of the source data and/or a portion of the first representation dataset is pre-coded at block 1116 using a second pre-coding scheme to generate a set of representation data, decodable in combination with the second representation dataset to provide a set of second-level playback data representing the set of source data.

For example, a video stream may be received at block 1104. A hierarchical pre-coding scheme may generate a base layer at block 1112. At the same time, the hierarchical pre-coding scheme may generate one or more enhancement layers at block 1116. Alternately, a portion of the video stream may be stored at block 1104 (either prior to, during, or subsequent to the pre-coding at block 1108). This stored data may then be pre-coded to generate the enhancement layers at block 1116.

At block 1120, a link condition may be generated, defining a condition of the communication link. For example, the link condition may relate to the bandwidth, latency, data integrity, bit error rate, etc. of the communication link. In some embodiments, all or part of the information used in block 1120 to generate the link condition is received from an external system or device (e.g., an aggregator system) at block 1124. In other embodiments, the link condition is determined by some other method, for example by testing the communication link for certain parameters.

The second representation dataset may be encoded at block 1128 into an encoded data signal as a function of the link condition generated in block 1120. In some embodiments, encoding the second representation dataset at block 1128 includes associating the first representation dataset and/or the second representation dataset with one or more coding and modulation schemes. In certain embodiments, the coding and/or modulation schemes are determined as a function of the link condition. For example, a base layer may be encoded using a high-order coding and modulation scheme, and an enhancement layer may be encoded using a lower-order coding and modulation scheme.

At block 1132, the encoded data signal may be transmitted over the communication link. In some embodiments, transmitting the encoded data signal at block 1132 occurs in stages. For example, the first representation dataset may be transmitted over the communication link at block 1132 when the link condition substantially matches a first link condition profile; and the second representation dataset may be transmitted over the communication link at block 1132 when the link condition substantially matches a second link condition profile. In certain embodiments, the encoded data signal is transmitted according to the coding and modulation scheme associated with the dataset (e.g., at block 1128.

Figure 12:
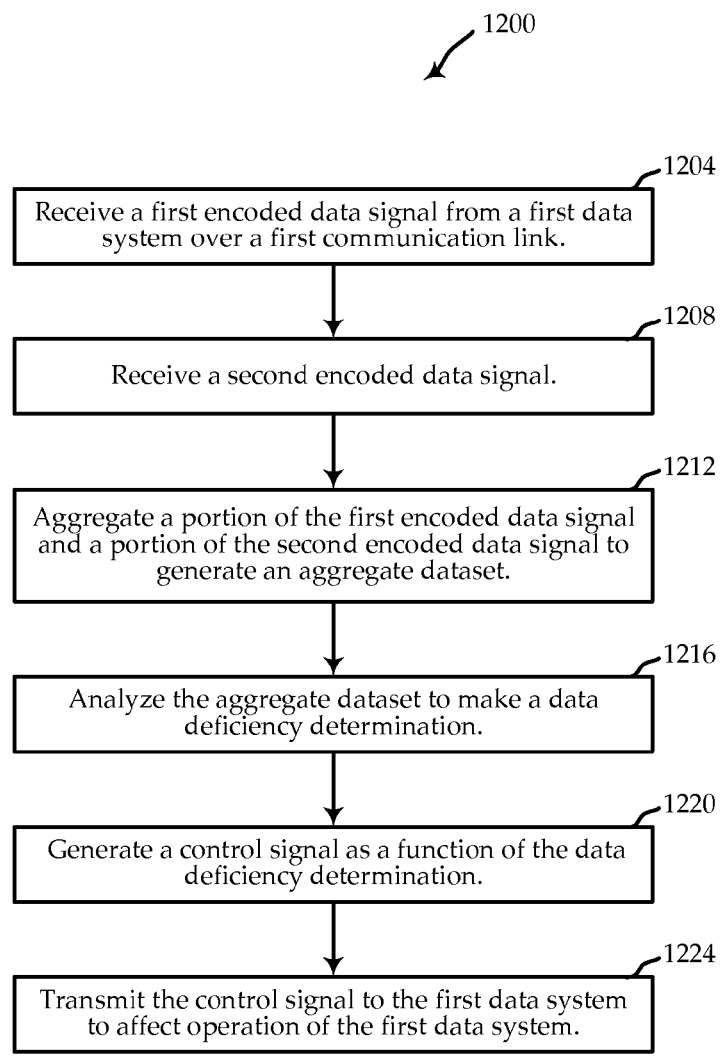
FIG. 12 provides a flow diagram describing methods for aggregating data received over communication links having changing link conditions, according to various embodiments of the invention.

The encoded signal(s) transmitted over communication links may be received, decoded, and/or aggregated. FIG. 12 provides a flow diagram describing methods for aggregating data received over communication links having changing link conditions, according to various embodiments of the invention. In some embodiments, the received and aggregated data was generated and transmitted by a method similar to the method 1100 of FIG. 11.

The method 1200 begins at block 1204 by receiving a first encoded data signal from a first data system over a first communication link. The first encoded data signal may have been encoded by the first data system using a first encoding scheme as a function of a first link condition defining a condition of the first communication link. At block 1208, a second encoded data signal is received. In some embodiments, receiving a second encoded data signal at block 1208 includes receiving the second encoded data signal from a second data system over a second communication link. The second encoded data signal may have been encoded by the second data system using a second encoding scheme as a function of a second link condition defining a condition of the second communication link.

At block 1212, a portion of the first encoded data signal and a portion of the second encoded data signal may be aggregated to generate an aggregate dataset. The aggregate dataset may be analyzed at block 1216 to make a data deficiency determination. The method may generate a control signal at block 1220 as a function of the data deficiency determination. At block 1224, the control signal may be transmitted to the first data system (and/or the second data system), the control signal being adapted to affect operation of the first data system.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory ("ROM"), random access memory ("RAM"), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Further, it will be appreciated that other and different components may be incorporated into or used by the devices and systems described herein, and functions of the various devices, systems, and components may be implemented in a number of ways. For example, the functions various components may be implemented in hardware, software, or firmware. Implementations of these functions may include one or more Application Specific Integrated Circuits ("ASICs") adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays ("FPGAs") and other Semi-Custom ICs), which may be programmed in any manner known in the art. Each may also be implemented, in whole or in part, with instructions embodied in a computer-readable medium, formatted to be executed by one or more general or application specific processors. Thus, the devices and systems may include different types and configurations of memory, which may be integrated into the hardware or may be one or more separate components.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A gateway system for opportunistically enhancing data provided to a plurality of subscriber terminals over communication links having changing link conditions, the gateway system comprising:
    a receiver unit that receives a set of source data representing media content;
    a precoder unit that precodes the set of source data according to a progressive encoding scheme such that the media content is represented by at least first-level playback data and second-level playback data, such that playback of the media content is at a first fidelity by using only the first-level playback data, and playback of the media content is at a second fidelity by combining the first-level playback data and the second-level playback data, the second fidelity being higher than the first fidelity; and
    a transceiver unit, communicatively coupled with the precoder unit, that:
        first communicates the precoded data to an opportunistic subscriber terminal over a communication link not in response to a request for the media content by the opportunistic subscriber terminal;
        receives a notification from the opportunistic subscriber terminal subsequent to the first communicating, the notification indicating a request for the media content by the opportunistic subscriber terminal; and
        second communicates, in response to receiving the notification and in response to determining that the opportunistic subscriber terminal failed to receive at least a portion of the second-level playback data as part of the first communicating, at least the portion of the second-level playback data to the opportunistic subscriber terminal over excess bandwidth on the communication link using a high-reliability coding and modulation scheme.

2. The gateway system of claim 1, further comprising: an adaptive coding and modulation unit that:
    associates the first-level playback data with a first coding and modulation scheme for first communication to the opportunistic subscriber terminal over the communication link; and
    associates the second-level playback data with a second coding and modulation scheme for first communication to the opportunistic subscriber terminal over the communication link,
    wherein the second coding and modulation scheme is less reliable than the high-reliability coding and modulation scheme.

3. The gateway system of claim 1, wherein the first and second coding and modulation schemes are different, and the second coding and modulation scheme is less reliable than the first coding and modulation scheme.

4. The gateway system of claim 1, wherein the notification comprises a request for retransmission of the portion of the second-level playback data.

5. The gateway system of claim 1, further comprising:
    a profiler unit that profiles a condition of the communications link by polling the communication link to determine its bandwidth until detecting that the excess bandwidth is available.

6. A method for opportunistically enhancing data provided over communication links having changing link conditions, the method comprising:
- first communicating media content from a first data system to an opportunistic second data system over a communication link not in response to a request for the media content by the opportunistic second data system, the media content encoded according to a progressive encoding scheme to be represented by at least first-level playback data and second-level playback data, such that playback of the media content is at a first fidelity by using only the first-level playback data, and playback of the media content is at a second fidelity by combining the first-level playback data and the second-level playback data, the second fidelity higher being than the first fidelity;
- receiving a notification at the first data system from the second data system subsequent to the first communicating, the notification indicating a request for the media content by the second data system; and
- second communicating, in response to receiving the notification signal and in response to determining that the opportunistic second data system failed to receive at least a portion of the second-level playback data as part of the first communicating, at least the portion of the second-level playback data to the second data system over excess bandwidth on the communication link using a high-reliability coding and modulation scheme.

7. The method of claim 6, wherein:
- the first-level playback data is first communicated to the second data system as a first encoded data signal using a first coding and modulation scheme;
- the second-level playback data is first communicated to the second data system as a second encoded data signal using a second coding and modulation scheme; and
- the second coding and modulation scheme is less reliable than the high-reliability coding and modulation scheme.

8. The method of claim 7, wherein the first and second coding and modulation schemes are different, and the second coding and modulation scheme is less reliable than the first coding and modulation scheme.

9. The method of claim 6, wherein the notification comprises a request for retransmission of the portion of the second-level playback data.

10. The method of claim 6, further comprising:
- polling the communication link to determine its bandwidth until detecting that the excess bandwidth is available.

11. The method of claim 10, wherein the second communicating is further in response to the detecting that the excess bandwidth is available.

12. A method for opportunistically enhancing data received over a communication link having changing link conditions, the method comprising:
- first receiving, by a opportunistic subscriber terminal from a gateway system over the communication link, at least first-level playback data representing media content, the media content encoded according to a progressive encoding scheme to be represented by at least first-level playback data and second-level playback data, such that playback of the media content is at a first fidelity by using only the first-level playback data, and playback of the media content is at a second fidelity by combining the first-level playback data and the second-level playback data, the second fidelity higher being than the first fidelity;
- transmitting a notification from the opportunistic subscriber terminal to the gateway system indicating a request for the media content by the opportunistic subscriber terminal; and
- second receiving, by the opportunistic subscriber terminal from the gateway system over the communication link, at least a portion of the second-level playback data in response to the notification and in response to determining that the opportunistic subscriber terminal failed to receive at least the portion of the second-level playback data as part of the first receiving.

13. The method of claim 12, further comprising:
- communicating a notification from the opportunistic subscriber terminal to the gateway system subsequent to the first receiving, the notification indicating that the opportunistic subscriber terminal failed to receive at least a portion of the second-level playback data,
- wherein the second receiving is in response to the notification signal.

14. The method of claim 13, wherein the notification comprises a request for retransmission of the portion of the second-level playback data.

15. The method of claim 13, wherein the communicating comprises:
- determining whether the opportunistic subscriber terminal has capability for playback of the media content at the second fidelity; and
- communicating the notification only when the opportunistic subscriber terminal has capability for playback of the media content at the second fidelity.

16. The method of claim 13, wherein the second receiving is over excess bandwidth on the communication link by a high-reliability coding and modulation scheme.

17. The method of claim 16, wherein:
- prior to communicating the notification, the second-level playback data is communicated to the opportunistic subscriber terminal using a coding and modulation scheme having lower reliability than the high-reliability coding and modulation scheme.

18. The method of claim 16, wherein the second receiving is further in response to the gateway system polling the communication link to determine its bandwidth, thereby detecting that the excess bandwidth is available.

19. The method of claim 12, wherein:
- the first-level playback data is received by the opportunistic subscriber terminal as a first encoded data signal using a first coding and modulation scheme; and
- the second-level playback data is received by the opportunistic subscriber terminal as a second encoded data signal using a second coding and modulation scheme.

20. The method of claim 12, further comprising:
- transcoding, by the opportunistic subscriber terminal, the received first-level playback data and second-level playback data into a single-level representation of the media content; and
- outputting the single-level representation to a consumer premises equipment communicatively coupled to the opportunistic subscriber terminal.

* * * * *